US009467202B2

(12) United States Patent
Lee et al.

(10) Patent No.: US 9,467,202 B2
(45) Date of Patent: Oct. 11, 2016

(54) METHOD AND APPARATUS FOR DOWNLOADING CONTENT USING NFC

(71) Applicant: LG ELECTRONICS INC., Seoul (KR)

(72) Inventors: Minsoo Lee, Seoul (KR); Sungsoo Kim, Seoul (KR); Yujung Jung, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 41 days.

(21) Appl. No.: 14/399,877

(22) PCT Filed: May 9, 2013

(86) PCT No.: PCT/KR2013/004102
§ 371 (c)(1),
(2) Date: Nov. 7, 2014

(87) PCT Pub. No.: WO2013/169043
PCT Pub. Date: Nov. 14, 2013

(65) Prior Publication Data
US 2015/0133049 A1    May 14, 2015

Related U.S. Application Data

(60) Provisional application No. 61/645,070, filed on May 10, 2012.

(51) Int. Cl.
*H04W 52/02* (2009.01)
*H04B 5/00* (2006.01)
*H04W 4/00* (2009.01)

(52) U.S. Cl.
CPC ........... *H04B 5/0031* (2013.01); *H04W 4/003* (2013.01)

(58) Field of Classification Search
CPC . H04B 5/0025; H04B 5/0031; H04W 4/003; H04W 52/02
See application file for complete search history.

(56) References Cited

U.S. PATENT DOCUMENTS

| | | | |
|---|---|---|---|
| 8,126,985 B1 * | 2/2012 | Kandekar et al. | ...... A63F 13/12 345/418 |
| 8,423,601 B2 * | 4/2013 | Tobita | ..................... H04L 67/02 709/202 |
| 2005/0015285 A1 | 1/2005 | Tamaki | |

(Continued)

FOREIGN PATENT DOCUMENTS

| | | |
|---|---|---|
| KR | 10-0775272 B1 | 11/2007 |
| KR | 10-2009-0039017 A | 4/2009 |
| KR | 10-2011-0067722 A | 6/2011 |

*Primary Examiner* — Andrew Wendell
(74) *Attorney, Agent, or Firm* — Birch, Stewart, Kolasch & Birch, LLP

(57) ABSTRACT

Disclosed are a method and apparatus for downloading content using NFC. The content-downloading method of the present invention is performed by a first device, and comprises the steps of: transmitting a content-downloading request for requesting a download of content using a second device; receiving a confirmation to the content-downloading request from the device which has received the content-downloading request; receiving a wake-up request from the second device; and receiving, from the second device, the content downloaded to the second device in response to the content-downloading request. Accordingly, a user may support a download reservation and transmission by simply placing NFC-supporting devices in contact, support a queue download request and list management using NFC between network attached storage (NAS) and a smart device, and support a queue request and caching using a home network after establishing an NFC link.

20 Claims, 24 Drawing Sheets

(56) References Cited

U.S. PATENT DOCUMENTS

| | | |
|---|---|---|
| 2008/0160970 A1 | 7/2008 | Srinivas Reddy et al. |
| 2008/0301262 A1* | 12/2008 | Kinoshita et al. .. H04L 12/2812 709/219 |
| 2009/0299823 A1* | 12/2009 | Nagasaka et al. ..... G06Q 10/00 705/7.29 |
| 2011/0111696 A1* | 5/2011 | Lazaridis ............ H04W 76/022 455/41.2 |
| 2012/0017282 A1* | 1/2012 | Kang et al. ............. G06F 21/10 726/26 |
| 2012/0071139 A1* | 3/2012 | Kumar et al. ........ H04W 4/001 455/414.1 |
| 2012/0096122 A1* | 4/2012 | Zhu et al. ................ H04W 4/18 709/219 |
| 2012/0163255 A1* | 6/2012 | Choi ..................... H04W 4/006 370/310 |
| 2013/0203349 A1* | 8/2013 | Hillan et al. ............. H04B 5/02 455/41.1 |
| 2013/0282564 A1* | 10/2013 | Sibbald ............. H04M 1/72525 705/39 |
| 2014/0012906 A1* | 1/2014 | Teja et al. ............ H04L 67/104 709/204 |

* cited by examiner

FIG. 3

| Interface | Server | Client | Transport Protocol | Notes |
|---|---|---|---|---|
| D1 | Content Server | QPE | As defined in Clause 10 | |
| P1 | Content Policy Server | QPE | HTTP/1.1 or HTTPS/1.1 | |
| D2 | QPE | Player | As defined in Clause 10.2.2 | |
| Q2 | QPE | Local Application | HTTP/1.1 or HTTPS/1.1 or an implementation specific transport | Local applications may use an implementation-specific transport if supported by the Client |
| P2 | Network Policy Client | QPE | Implementation-specific IPC transport | |
| D3 | Intermediate Device | QPE | HTTP/1.1 or HTTPS/1.1 | |
| Q3 | QPE | Intermediate Device | UPnP/HTTP/1.1 as defined in Clause 10 | |
| D4 | Content Server | Intermediate Device | HTTP/1.1 or HTTPS/1.1 | |
| P4 | Content Server | Intermediate Device | HTTP/1.1 or HTTPS/1.1 | Only Policy XML structures may be downloaded in this manner |
| Q4 | Content Server | Intermediate Device | HTTP/1.1 or HTTPS/1.1 | Q4 transactions may be initiated by the Content Server via an external trigger not defined in this specification |
| S | Virtual Storage Device | QPE | Implementation-specific transport | |

FIG. 20

Recently Connected Device List

| Item | Type |
|---|---|
| Device FriendlyName | String |
| IP Address | String |
| Port Number | String |
| Last Connected Time | String |
| Last Connected Network Access Type | String(Ethernet, 802.11, MoCA, Bluetooth) |

FIG. 24

Device Capability Structure

| Capability Item | Type |
| --- | --- |
| Device ID | URI |
| Device Name | String |
| Device FriendlyName | String |
| User ID | String |
| CurrentPowerSource | String → "AC Power" "Battery" |
| Charging Status | String |
| Power Level | UINT |
| Supporting Media Profils (Formats) | PD,SD,HD |
| Supporting Codec Types | MIME type |
| Storage Capacity (GBytes) | Unsigned Long |
| Storage Function Groups | String |
| PointNode | String |
| Storage Usage | UINT[0:100] |
| Maximum Size of QueueRequest | UINT |
| Maximum number of QueueRequest | UINT |
| Current number of QueueRequest | UINT |
| NetworkInterfaceNumberOfEntries | UINT |
| Network Access Type (/UPnP/DM/DeviceInfo/PhysicalDevice/NetworkInterface/#/) | String(Ethernet, 802.11, MpCA, Bluetooth |
| Media Transport | HTTP (Mandatory)RTP (Optional) |
| Bandwidth Limit (MBytes) | UINT |

METHOD AND APPARATUS FOR DOWNLOADING CONTENT USING NFC

CROSS REFERENCE TO RELATED APPLICATIONS

This application is the National Phase of PCT International No. PCT/KR2013/004102 filed on May 9, 2013, which claims priority under 35 U.S.C. 119(e) to U.S. Provisional Application No. 61/645,070, filed on May 10, 2012, all of which are hereby expressly incorporated by reference into the present application.

BACKGROUND OF THE INVENTION

1. Field of the Invention

The present invention relates to a content downloading method and apparatus and, more particularly, to a method and apparatus for downloading to a device that forms network service using Near Field Communication (NFC).

2. Related Art

Recently, as ultra-high speed wireless communication infrastructure is constructed and a variety of types of wireless portable devices are spread out, tasks performed through an existing fixed device, such as a PC, have become able to be performed using a mobile device. In particular, a smart device, such as a smart pad or a smart phone, provides excellent portability, that is, the greatest advantage of a mobile device, has performance no less than a PC and a screen much larger than an existing screen, and thus has become able to provide services of new and convenient types that could not be provided by an existing fixed device.

A mobile device, such a smart device, is used for information search through the Internet, for example, a variety of types of service fields, such as e-commerce, online banking, game, navigation, and mobile messenger service, based on a variety of types of applications installed on the mobile device. Furthermore, the mobile device is increasingly used through interoperation with home devices within a home network, such as accessing the home network and controlling the home devices, sending content to a home device, or receiving content from a home device.

In order to provide the mobility of a smart device, wireless communication may be used. In order to overcome a limit to wireless communication resources provided to a smart device, communication through Near Field Communication (NFC) between smart devices may be performed.

In general, communication using conventional NFC provided service for sending data between devices when NFC connection is set up. That is, a prior art had a problem in that scheduling downloading, a downloading queue request, and the playback of downloaded content were not performed because a downloading scheduling protocol, a downloading queue request data format, and a downloading and content playback application interface were not defined in order to support the downloading scheduling of a target device for specific content if NFC connection between devices is possible.

Furthermore, a technology using conventional NFC had a limited use in device utilization through NFC connection because it did not have a function of automatically providing notification that content downloading scheduling or downloading was completed when content downloading scheduling or downloading to another device was completed and a function of providing event notification through another network interface if the connection of a device to NFC is impossible.

SUMMARY OF THE INVENTION

An object of the present invention for solving the aforementioned problems is to provide a method and apparatus for downloading content using NFC, including content downloading scheduling (i.e., queued downloading by a queue request) and a wake-up function for sending downloaded content after content is downloaded using a peer-to-peer model between two client devices capable of NFC connection.

Furthermore, another object of the present invention is to provide a method and apparatus for downloading content using NFC, wherein a downloading request can be transmitted to a cloud service server in addition to devices connected through NFC and a queue request can be simultaneously transmitted to a target client device and a cloud service server so that an asset related to content is downloaded to the target client device and the cloud service server.

Furthermore, yet another object of the present invention is to provide a method and apparatus for downloading content using NFC, wherein an NFC message for a downloading scheduling request is defined, and a detailed User Interface (UI) of a client device can be provided so that after the client device sends a queue request to a target device through NFC, the client device that has processed a scheduling request can receive completed content when downloading is completed in the target device.

A content downloading method of the present invention for achieving the object is performed by a first device and may include steps of sending a content downloading request that requests content to be downloaded using a second device, receiving confirmation that responds to the content downloading request from a device that has received the content downloading request, receiving a wake-up request from the second device, and receiving the content, downloaded to the second device, from the second device in response to the content downloading request.

The downloading method may further include a step of entering sleep mode in response to the confirmation.

At least any one of the content downloading request, the confirmation, and the wake-up request may be transmitted and received using Near Field Communication (NFC).

The step of receiving the wake-up request may include at least one of steps of receiving the wake-up request through NFC and receiving the wake-up request through a Wireless Local Area Network (WLAN) or 3G/4G wireless communication.

The content downloading request may include downloading-related information, including source URI information of the downloading content, a downloading time indicative of an available downloading time, and wake-up time information indicative of a downloading start time.

The content downloading request may include at least any one of power connection status information, battery status information, network status information, and available storage space information that are information related to conditions in which the first device receives the downloaded content.

The step of sending the content downloading request may include at least any one of steps of directly sending the content downloading request to the second device and sending the content downloading request to a third device.

The third device may be a device for relaying between a server related to a cloud service or the first device and the second device.

The downloading method further includes steps of displaying a user interface for selecting the content to be downloaded and selecting the content in response to a content selection signal. The step of sending the content downloading request may include a step of automatically sending the content downloading request to the second device when the first device is connected to the second device based on the selection of the content.

The downloading method may further include steps of discovering accessible surrounding devices using a recently connected device list and obtaining the source URI of content to be downloaded from a content server.

The step of receiving the downloaded content may include steps of determining whether a condition in which the downloaded content is able to be received is satisfied and receiving the downloaded content based on the determination.

A content downloading apparatus of the present invention for achieving the object may include a transmission unit which sends a content downloading request that requests content to be downloaded using a second device and a reception unit which receives confirmation responding to the content downloading request, receives a wake-up request from the second device, and receives the content, downloaded to the second device, from the second device in response to the content downloading request.

A content downloading method of the present invention for achieving the object is performed by a second device and may include steps of receiving a content downloading request from at least any one of a first device and a third device, sending confirmation responding to the content downloading request, downloading content to be downloaded based on the content downloading request, sending a wake-up request to the first device, and sending the downloaded content to the first device.

At least any one of the content downloading request, the confirmation, and the wake-up request may be transmitted and received using Near Field Communication (NFC).

The content downloading request may be received from the third device different from the first device, and the content to be downloaded may be downloaded from the third device.

The step of sending the wake-up request transmission may include steps of sending the wake-up request through NFC and sending the wake-up request through a Wireless Local Area Network (WLAN) or 3G/4G wireless communication if a response to the wake-up request transmitted through NFC is not received from the first device for a reference time.

The step of sending the downloaded content may include steps of determining whether or not to send the downloaded content based on information that is included in the content downloading request and that is related to a condition in which the first device receives the downloaded content and sending the downloaded content to the first device based on a result of the determination.

A content downloading apparatus of the present invention for achieving the object may include a reception unit which receives a content downloading request from at least any one of a first device and a third device and downloads content from the first server based on the content downloading request and a transmission unit which sends confirmation responding to the content downloading request, sends a wake-up request to the first device, and sends the downloaded content to the first device.

A content downloading system of the present invention for achieving the object may include a first device which sends a content downloading request that requests content to be downloaded using a second device, receives confirmation responding to the content downloading request, receives a wake-up request from the second device, and receives the content, downloaded to the second device, in response to the content downloading request and a second device which receives the content downloading request, sends the confirmation, downloads the content to be downloaded based on the content downloading request, sends the wake-up request to the first device, and sends the downloaded content to the first device.

The downloading system may further include a third device which receives the content downloading request from the first device, sends the confirmation responding to the content downloading request to the first device, and sends the content downloading request to a second device.

In accordance with the method and apparatus for downloading content using NFC according to the present invention, there are advantages in that downloading scheduling and transmission are supported when a user has only to touch NFC support devices and a queue downloading request and list management using NFC are supported between a Network Attached Storage (NAS) and a smart device so that a queue request and caching using a home network can be supported after NFC link is set up.

Furthermore, in accordance with the method and apparatus for downloading content using NFC according to the present invention, there is an advantage in that downloading or a sync function between a cloud service server and a device can be previously taken into consideration using a home network with respect to only a selected file because the sync function for the cloud service server can be supplemented.

Furthermore, in accordance with the method and apparatus for downloading content using NFC according to the present invention, there is an advantage in that a procedure of a user frequently checking the status of a remote device can be reduced because downloading is performed when a remote device is available through a cloud service if a client device is unable to directly send a downloading scheduling request to the remote device.

Furthermore, in accordance with the method and apparatus for downloading content using NFC according to the present invention, there are advantages in that device resources can be reduced because only a device in which downloading is performed is turned on and other devices enter sleep mode, service providing of a specific level or higher is guaranteed for a device having lower performance, and thus a device production cost can be reduced.

BRIEF DESCRIPTION OF THE DRAWINGS

FIG. 3 is a table illustrating the interfaces illustrated in FIG. 2.

FIG. 20 is a diagram illustrating the structure of a recently connected device list.

FIG. 24 is a table illustrating a device capability structure.

DESCRIPTION OF EXEMPLARY EMBODIMENTS

Figure 1:
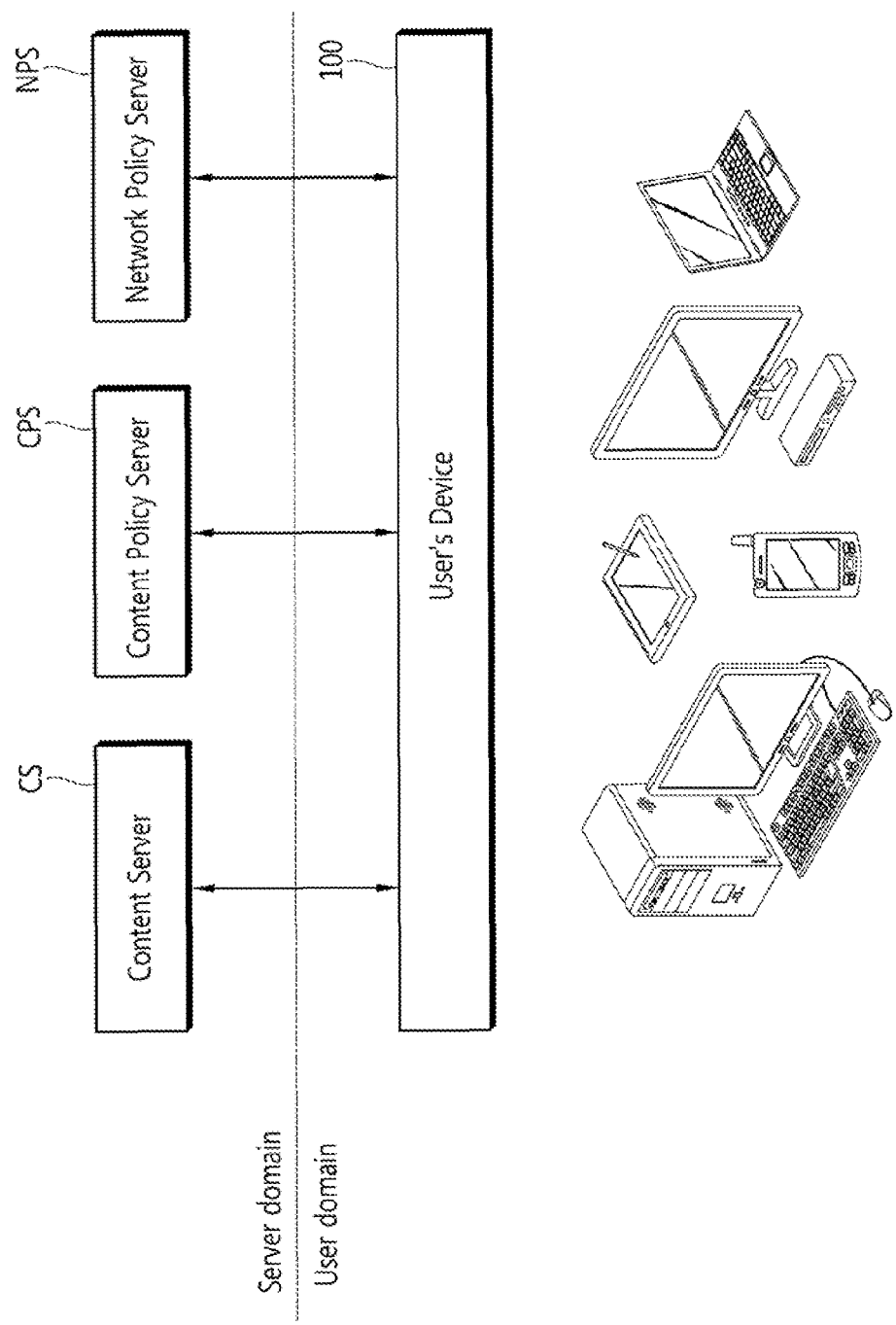
FIG. 1 is a block diagram illustrating the configuration of a content service system to which a content downloading method in accordance with an embodiment of the present invention may be applied.

The present invention may be modified in various ways and may be implemented to have several embodiments. Specific embodiments are illustrated in the drawings and are described in detail.

It is however to be understood that the present invention is not intended to be limited to the specific embodiments, but that the specific embodiments include all modifications, equivalents, and substitutions which fall within the spirit and technical scope of the present invention.

Terms, such as the first and the second, may be used to describe various elements, but the elements should not be restricted by the terms. The terms are used to only distinguish one element from the other element. For example, a first element may be named a second element without departing from the scope of the present invention. Likewise, a second element may be named a first element. The term "and/or" includes a combination of a plurality of related and illustrated items or any one of a plurality of related and described items.

When it is said that one element is "connected" or "coupled" with the other element, it should be understood that one element may be directly connected or coupled with the other element, but a third element may exist between the two elements. In contrast, when it is said that one element is "directly connected" or "directly coupled" with the other element, it should be understood that a third element does not exist between the two elements.

The terms used in this application are used to only describe specific embodiments and are not intended to restrict the present invention. An expression of the singular number includes an expression of the plural number unless clearly defined otherwise in the context. In this application, terms, such as "comprise" or "have", are intended to designate that characteristics, numbers, steps, operations, elements, or parts which are described in the specification, or a combination of them exist, and should not be understood that they exclude the existence or possible addition of one or more other characteristics, numbers, steps, operations, elements, parts, or combinations of them in advance.

All terms used herein, unless defined otherwise, have the same meanings as those typically understood by those having ordinary skill in the art. The terms, such as ones defined in common dictionaries, should be interpreted to have the same meanings as terms in the context of pertinent technology, and should not be interpreted to have ideal or excessively formal meanings unless clearly defined in the specification.

Hereinafter, some exemplary embodiments of the present invention are described in more detail with reference to the accompanying drawings. In describing the present invention, in order to help general understanding, the same reference numerals are used to denote the same elements throughout the drawings, and a redundant description of the same elements is omitted.

FIG. 1 is a block diagram illustrating the configuration of a content service system to which a content downloading method in accordance with an embodiment of the present invention may be applied.

As illustrated in FIG. 1, the content service system may be divided into a server domain and a user domain.

The server domain may manage services, network policies, etc. for content services and may provide content to the user domain based on the policies. That is, the server domain may mean a domain that includes servers for providing content services. Such a server domain may perform the providing of content to the user domain, the management of services for the user domain, etc., such as the production, selling, distribution, policy operation, and rights limit of content.

The server domain may include a Content Server (CS) for providing content, a Content Policy Server (CPS) for managing policies for content services, a Content Policy Server (NPS) for managing a network policy, etc. The number of CSs may be plural. For example, the server domain may include a content downloading server for content downloading, a content streaming server for content streaming, and so on.

The user domain may include the devices 100 of users. The devices 100 may be fixed type terminals, such as PCs and set-top boxes, or may be portable terminals, such as smart phones, portable phones, mobile handsets, tablets, Personal Digital Assistants (PDAs), and laptop computers. The devices 100 may access a local network based on UPnP, a DLNA, etc. and may interoperate with each other through wired or wireless communication.

The device 100 of a user may be a client device or an intermediate device.

The client device may mean a physical hardware device that is equipped with at least one network interface and local storage. For example, the client device CD may be a mobile handset, a tablet, a smart phone, or the like which may consume content. The client device may include modules for being supplied with content service.

The intermediate device may be a dual role client/server device on a network which may be used to stage assets destined for a client device. The intermediate device may temporarily hold an asset until the asset is transferred to the client device. In general, the intermediate device does not directly consume content, but may directly consume content. For example, the intermediate device may stage content. That is, the intermediate device may download content from a server and may store and play back the content.

Figure 2:
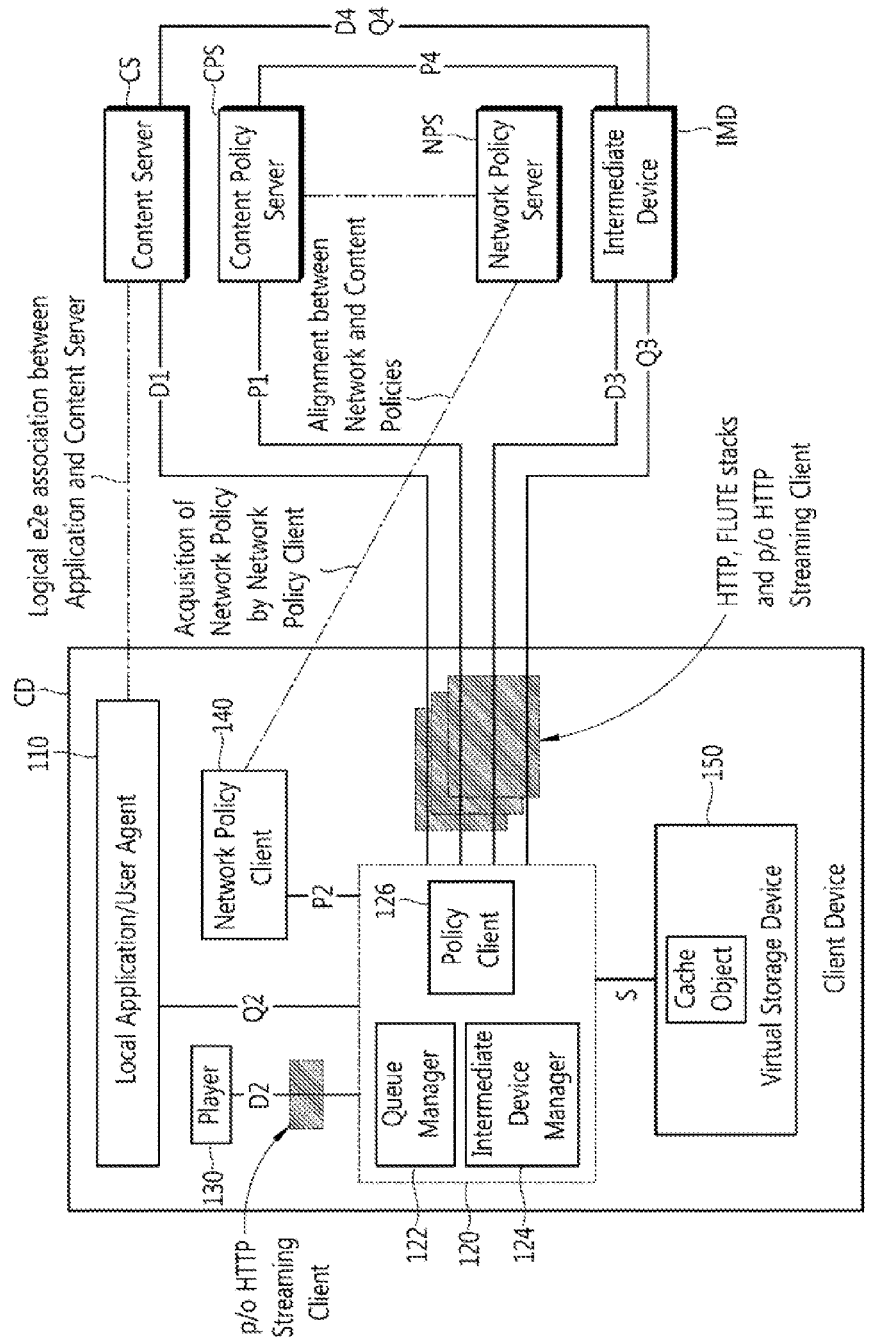
FIG. 2 is a block diagram illustrating a detailed structure of a client device of a content service system and related interfaces thereof.

FIG. 2 is a block diagram illustrating a detailed structure of the client device of a content service system and related interfaces thereof.

As illustrated in FIG. 2, the client device CD may include a local application/user agent 110, a player 130, a network policy client 140, a virtual storage device 150, a queue/policy engine (QPE) 120, etc.

The local application/user agent 110 may mean software for content service and include a local application and a user agent. For example, the local application/user agent 100 may provide user interfaces, service menus, service selection, content selection, and so on for allowing a user to be supplied with content service.

The local application is software resident in the client device and may communicate with the queue/policy engine 120 using a specific interface protocol, for example, a Q2 interface protocol. The user agent may means software for rendering and executing a server-supplied application, such as the web browser or middleware of the client device (CD). The local application/user agent 100 may become active when the downloading of content is started or completed.

The player 130 is for playing back content provided through content service and may be, for example, a media player capable of playing back downloading content or streaming content. The network policy client 140 may obtain a network policy while communicating with an NPS and control the client device based on the obtained network policy.

The virtual storage device 150 is a representation of a local depository that may be accessed through a cache object. For example, the virtual storage device 150 may be a common local depository, such as a hard disk, USB memory connected to a device, flash memory, a virtual region, such as Demon, or the like.

When a policy given by a CPS or an NPS is satisfied, the queue/policy engine 120 of the client device CD may send a request for the caching/downloading of content in order to cache/download specific content (asset) of a Content Server (CS). Such a request may be called a queue request. For example, the queue request may include an URI corresponding to the content (asset). The queue request may further include a codec type media profile, a container type, a Multipurpose Internet Mail Extension (MIME) type, a store name, a total length of the queue request, content information, policy information, and so on. Furthermore, the queue request may include bandwidth information for each source URL estimated by the local application/user agent 110.

The queue/policy engine 120 is a module included in the client device CD and may perform communication through interface protocols P1, S, D1, D2, Q2, D3, and Q3. The queue/policy engine 120 may maintain a queue on behalf of each local application and a content server CS, may interface with storage, and may be responsible for synchronizing a queue request with a policy. Accordingly, the queue/policy engine may also be called a service client for content sharing service.

Such a queue/policy engine 120, that is, QPE, may include a queue manager 122, a policy client 126, an intermediate device manager 124, and so on.

The queue manager 122 may manage a queue for the downloading or streaming of content. For example, the queue manager 122 may include a stream queue manager and a downloading manager. The queue manager 122 may send a queue request to an intermediate device (IMD) and receive a corresponding response from the IMD or may receive a queue request from an IMD and send a corresponding response. For example, the queue manager 122 may send a queue request that requests an IMD to download specific content from a content server CS, to the IMD and receive a corresponding response. The queue manager 122 may send, to an IMD, a queue request that requests the IMD to send content, downloaded from a content server CS, to the client device.

Furthermore, the queue manager 122 may perform a rights check for the use of content. For example, the queue manager 122 may perform a rights check for staging an asset, corresponding to content selected by the local application/user agent 110, through an IMD, for example, a rights check for downloading an asset from a content server CS to an IMD. The rights check may include a Digital Right Management (DRM) capability check and a license check.

In the DRM capability check, whether the IMD may support a DRM system that protects the asset may be verified based on information about the DRM of the asset and DRM capabilities regarding the IMD. In the license check, whether the license IMD may obtain a license for the use of the asset may be verified. For example, the license check may be the check of rights defined in a right token.

The reception of a requested asset managed by a queue may be achieved using unicast downloading, multicast downloading, or a combination of the two mechanisms. The queue/policy engine 120 needs to preserve a single queue although the priorities or order of instructions defined in a queue interface are changed.

The policy client 126 is a subsystem of the queue/policy engine 120 and maintains a policy object. The policy client 126 may control the queue/policy engine 120 according to policies from a CPS. For example, the policy client 126 may retrieve policies from a CPS and adjust a queue request behavior.

The intermediate device manager 124 may manage IMDs which operates in conjunction with the client device CD. For example, the intermediate device manager 124 may discover an IMD connected to a network and manage the status of the IMD. The intermediate device manager 124 may send or receive required messages to or from an IMD.

FIG. 3 is a table illustrating the interfaces illustrated in FIG. 2.

As illustrated in FIG. 3, the interfaces related to the content service system may be classified into P, Q, S, and D interface groups. The interfaces may interoperate with each other in a client-server structure.

The P interface group may define a link and policy between the queue/policy engine 120 and a content policy server CPS. Such a P interface group may include interfaces P1 and P2. In the interface P1, a server may be a content policy server CPS, and a client may be the queue/policy engine 120. In the interface P2, a server may be the network policy client 140, and a client may be the queue/policy engine 120. In an interface P4, a server may be a content server CS, and a client may be an intermediate device IMD.

The Q interface group may define queue request handling. The Q interface group may be a primary command channel which associates a content server CS, intermediate device IMDs, and the queue/policy engine 120 with each other. The Q interface group may allow a caching functionality to be called by a local application. In a Q2 interface, a server may be the queue/policy engine 120, and a client may be a local application.

A queue request presented via a Q2 interface protocol, that is, an interface between a local agent and the queue/policy engine, includes a complete URL that may be called from the context of a user agent or calling local application in order to download an asset. Alternatively, the queue request may include a local URL that calls a calling local application for the purpose of pre-negotiated downloading.

In a Q3 interface, a server may be the queue/policy engine 120, and a client may be an intermediate device IMD. In a Q4 interface, a server may be a content server CS, and a client may be an intermediate device IMD.

The S interface group may abstract storage and cache capabilities to the queue/policy engine. In the S interface, a server may be the virtual storage device 150, and a client may be the queue/policy engine 120.

The D interface group may be used to send data. In a D1 interface, a server may be a content server CS, and a client may be the queue/policy engine 120. In a D2 interface, a server may be the queue/policy engine 120, and a client may be the player 130. In a D3 interface, a server may be an intermediate device IMD, and a client may be the queue/policy engine 120. In a D4 interface, a server may be a content server CS, and a client may be an intermediate device IMD.

Figure 4:
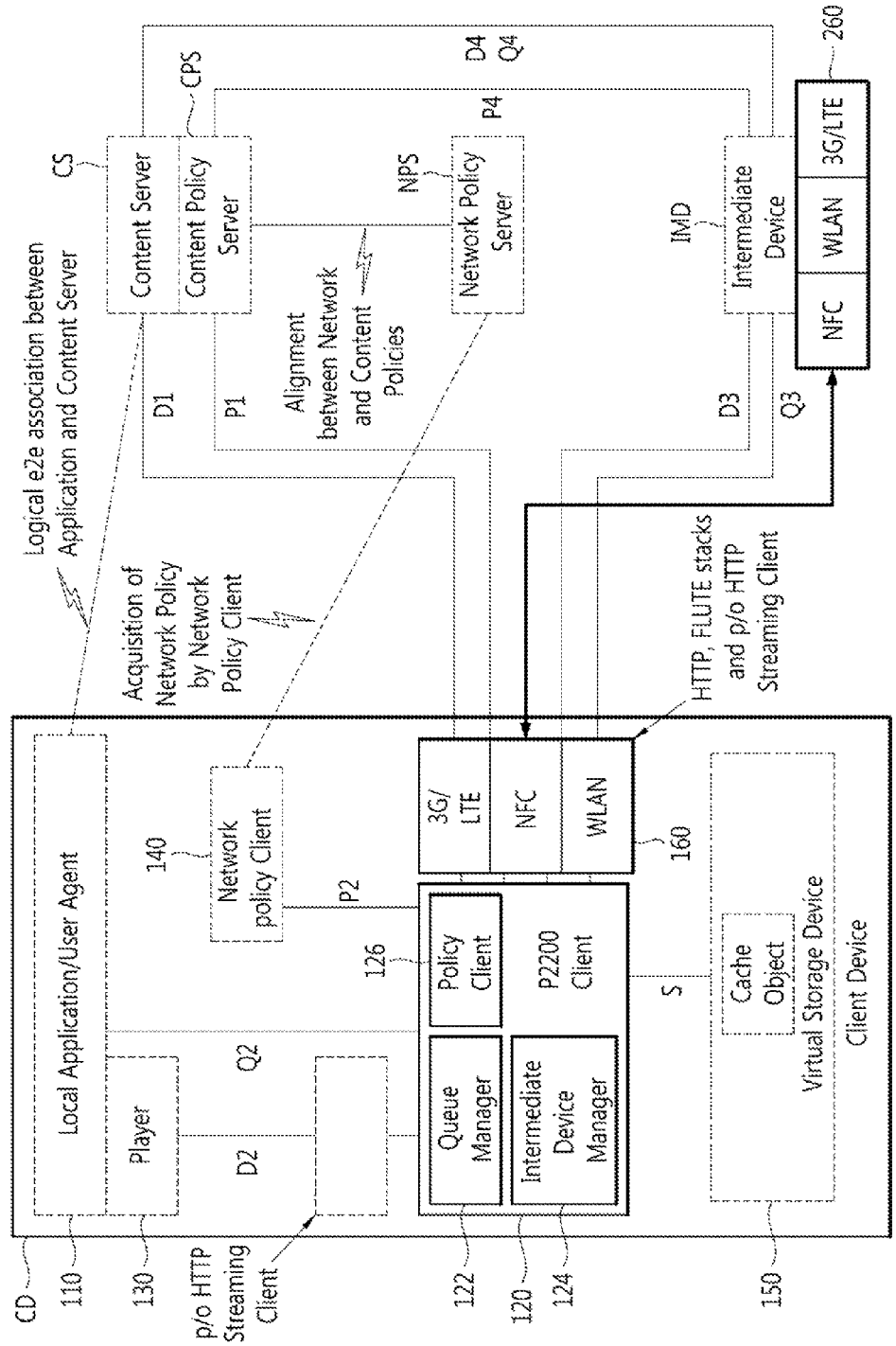
FIG. 4 is a block diagram illustrating the configuration of a content service system to which a method for downloading content using NFC in accordance with an embodiment of the present invention may be applied.

FIG. 4 is a block diagram illustrating the configuration of a content service system to which a method for downloading content using NFC in accordance with an embodiment of the present invention may be applied. As illustrated in FIG. 4, the method for downloading content in accordance with an embodiment of the present invention may be applied to the content service system in which communication units 160 and 260 are included in the client device CD and intermediate device IMD of the content service system illustrated in FIG. 1, respectively.

Referring to FIG. 4, the client device CD may include the communication unit 160. The communication unit 160 may include a transmission unit (not illustrated) and a reception unit (not illustrated). The communication unit 160 may send a queue request (or a content downloading request) from the queue/policy engine 120 to the communication unit 260 of the intermediate device IMD. The queue request is for requesting the intermediate device IMD to download specific content (content related to a source URI) and may include a request that requests downloaded content to be transmitted to the client device CD.

Furthermore, the client device CD may receive a confirmation message and a wake-up request for the queue request from the intermediate device IMD. Furthermore, the communication unit 160 does not necessarily support only communication with an intermediate device, but may also support communication with another device or server. The communication unit 160 may receive the queue request, confirmation message, and wake-up request based on several wireless communication methods. The several wireless communication methods may include 3G/Long Term Evolution (LTE), NFC, and a Wireless Local Area Network (WLAN). The communication unit 160 may included at least any one of an NFC device and communication modules related to 3G/4G and a WLAN. Although not illustrated, the communication unit 160 may support other wireless communication methods based on 802.11 and 802.16, but is not necessarily limited to the methods.

The communication unit 260 of the intermediate device IMD may also include a transmission unit (not illustrated) and a reception unit (not illustrated). The communication unit 260 may included at least any one of an NFC device and communication modules related to 3G/4G and a WLAN. Accordingly, the intermediate device IMD may also support various wireless communication methods, such as 3G/LTE, NFC, and a WLAN. Although not illustrated, the communication unit 260 may support other wireless communication methods based on 802.11 and 802.16, but is not necessarily limited to the methods. The communication unit 260 may receive a queue request from the client device CD and send a confirmation message and wake-up request for the queue request. In this case, the communication unit 260 may send and receive at least any one of the queue request, the confirmation message, and the wake-up request through NFC using the NFC device.

Figure 5:
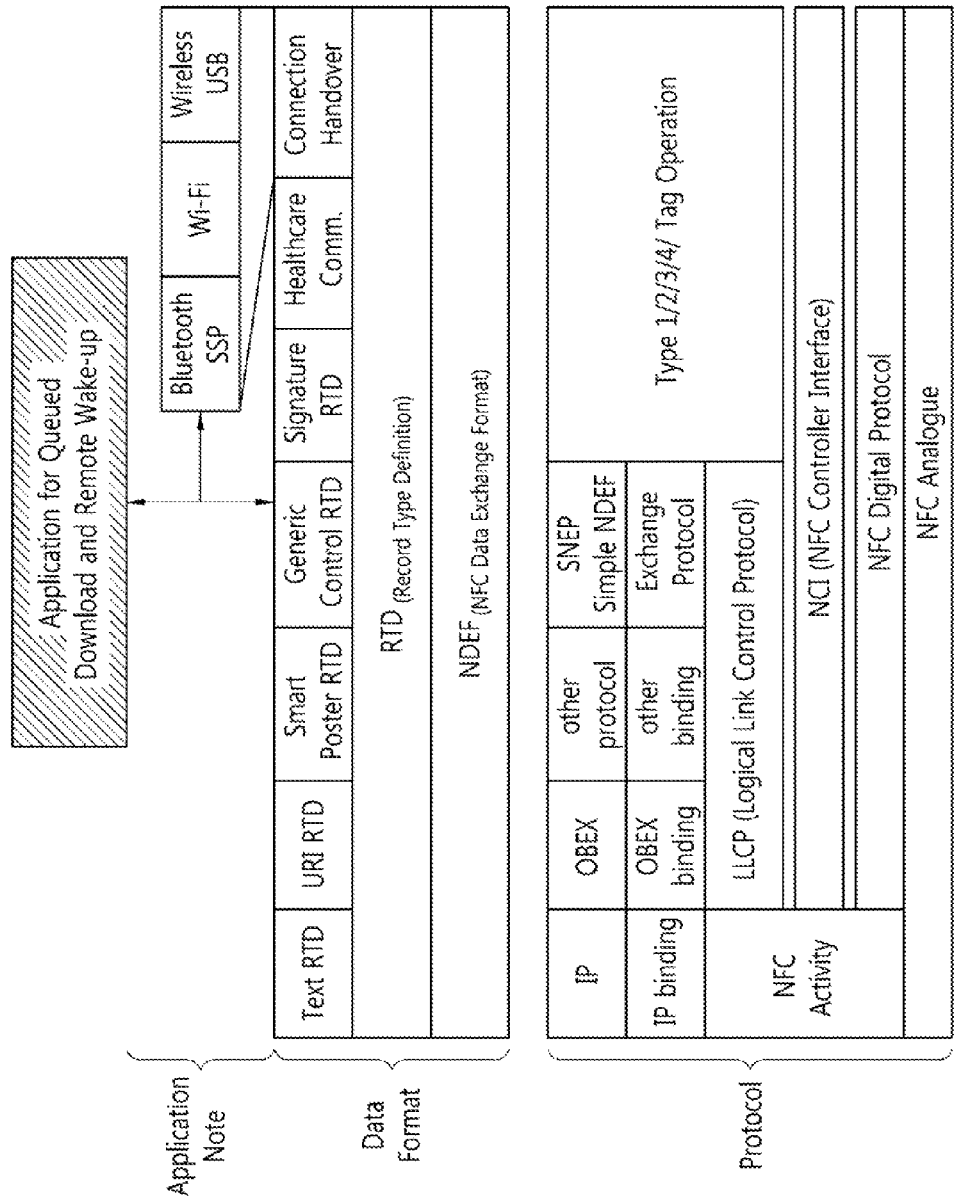
FIG. 5 is a block diagram illustrating the location of an application on an NFC stack protocol which is related to the content downloading method using NFC in accordance with an embodiment of the present invention.

FIG. 5 is a block diagram illustrating the location of an application on an NFC stack protocol which is related to the content downloading method using NFC in accordance with an embodiment of the present invention.

Referring to FIG. 5, the application related to the content downloading method using NFC in accordance with an embodiment of the present invention is placed at the top of the NFC stack protocol. That is, the application for scheduling downloading and remote wake-up in accordance with an embodiment of the present invention may operate based on an NFC protocol. The location of the application on the protocol stack may be over a protocol, a data format, and an application note. Accordingly, the content downloading application using NFC may use a conventional data format and protocol related to NFC without change.

Figure 6:
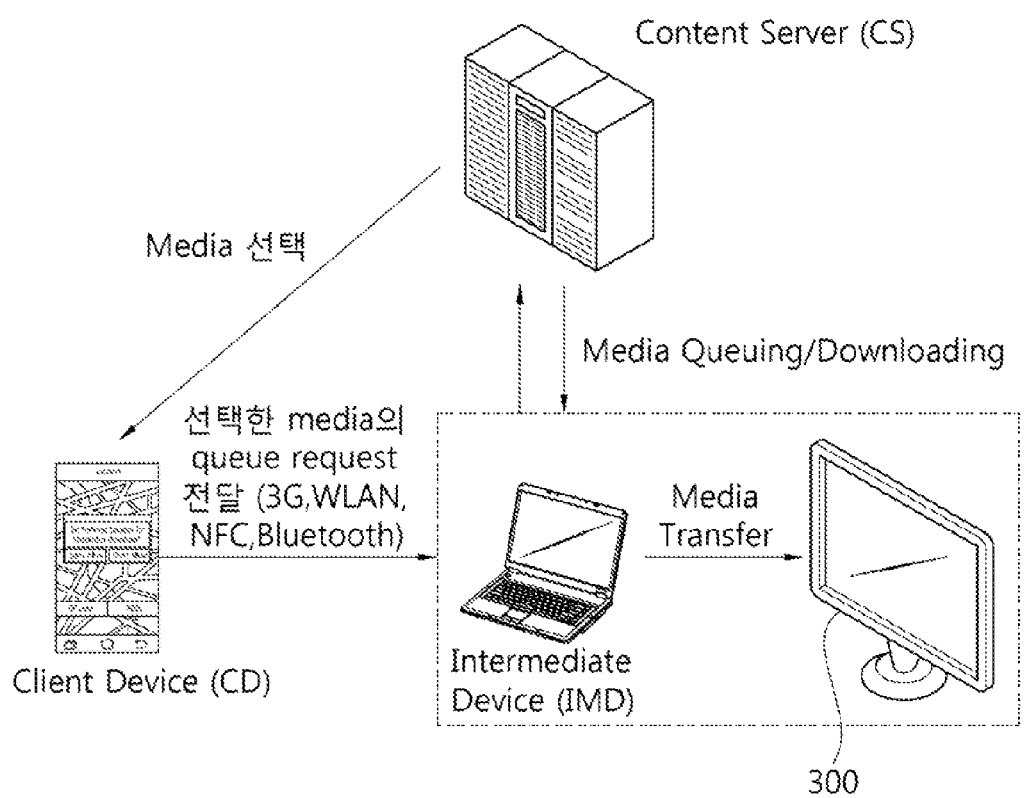
FIG. 6 is a diagram illustrating a content downloading and queue request for another device in the content downloading method using NFC in accordance with an embodiment of the present invention.

FIG. 6 is a diagram illustrating a content downloading and queue request for another device in the content downloading method using NFC in accordance with an embodiment of the present invention.

Referring to FIG. 6, the client device CD selects desired content from a plurality of pieces of media content provided by the content server CS. Thereafter, the queue/policy engine 120 of the client device CD generates a queue request for the selected media content and transfers the queue request to the intermediate device IMD through the communication unit 160. In this case, the client device CD may transfer the queue request to the intermediate device IMD through wireless communication based on NFC or 3G/4G or a wireless communication method, such as a WLAN or Bluetooth, using an NFC device or a communication module. The intermediate device IMD that has received the queue request may parse information about the source URI of content included in the queue request and may queue/download the media content from the content server CS. Furthermore, the intermediate device IMD may send the media content to another device 300. In this case, technologies related to a home network, such as Digital Entertainment Content Ecosystem (DECE) and UPnP/DLNA, may be applied.

In accordance with an embodiment of the present invention, the client device CD may support a user configuration. A local application on the client device CD manages policies and queue managing on behalf of use. More specifically, the client device CD may manage policies for downloading/uploading. Furthermore, the client device CD may determine whether a WLAN will be used or 3G/4G wireless communication will be used and determine whether a plug-in method through power connection will be used or a battery will be used through such a user configuration. Furthermore, the client device CD may support a determination of whether a queue request or downloading will be performed in a daytime period or nighttime period through the user configuration.

Figure 7:
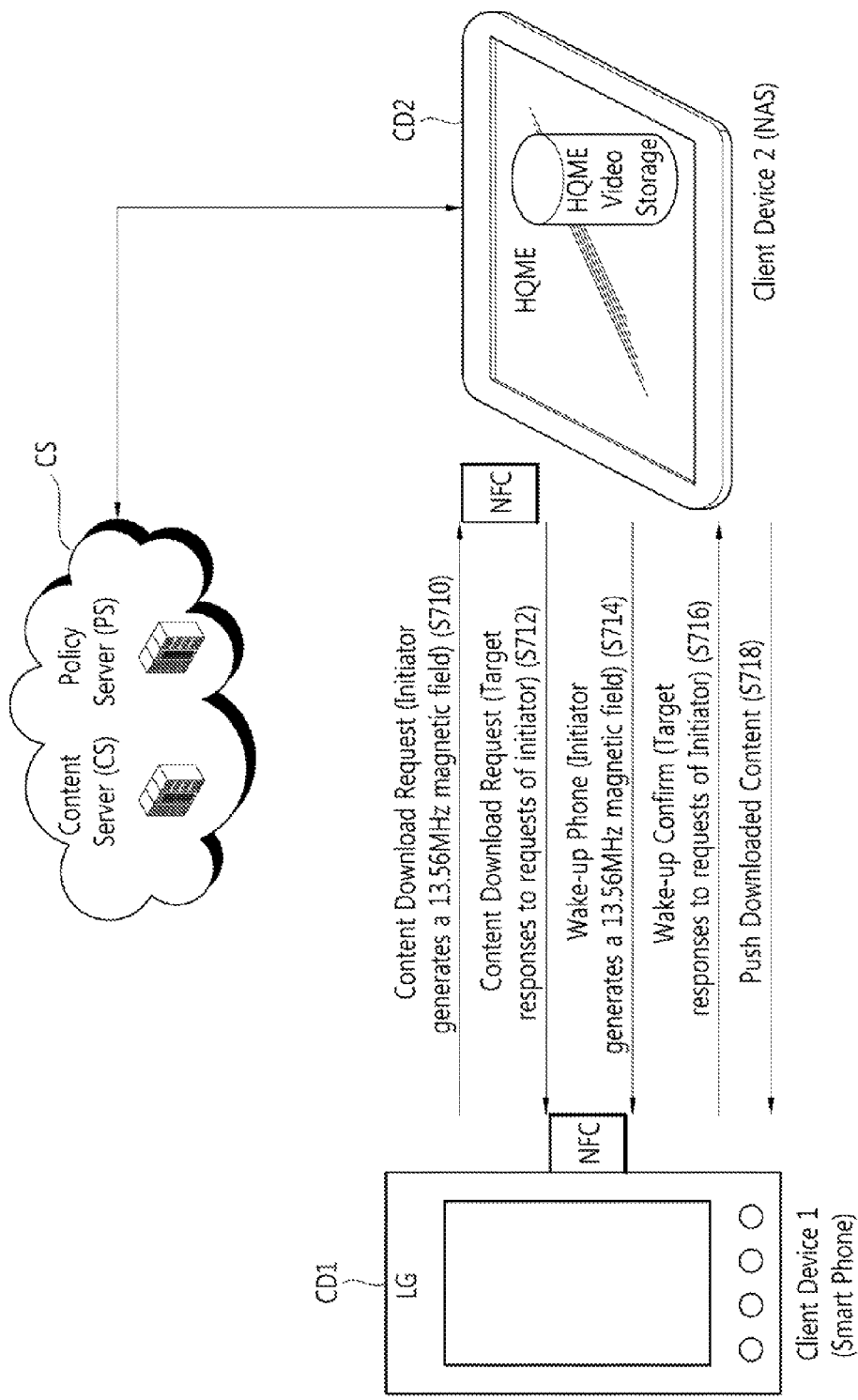
FIG. 7 is a diagram illustrating a flow of signals transmitted and received between a first client device, a second client device, and a content server in the content downloading method in accordance with an embodiment of the present invention.

FIG. 7 is a diagram illustrating a flow of signals transmitted and received between a first client device CD1, a second client device CD2, and the content server CS in the content downloading method in accordance with an embodiment of the present invention.

Referring to FIG. 7, the first client device CD1 is a device which processes a content downloading request (or a queue request) that requests the second client device CD2 to perform content downloading. The first client device CD1 may be a fixed terminal, such as a PC or a set-top box or may be a portable terminal, such as a smart phone, a Personal Digital Assistant (PDA), or a laptop computer. In particular, the first client device CD1 may support Near Field Communication (NFC) in order to provide seamless content transmission between devices through a simple user operation. That is, as described above, the communication unit 160 of the first client device CD1 may include an NFC device.

Furthermore, the second client device CD2 may be an intermediate device or a target device. The second client device CD2 is a device which downloads content in response to a request from the first client device CD1. The second client device CD2 may be a remote device spaced apart from the first client device CD1. Like the first client device CD1, the second client device CD2 may be a fixed terminal, such as a PC or a set-top box, or may be a portable terminal, such as a smart phone, a PDA, or a laptop computer. The second client device CD2 may be a specific server or storage. Furthermore, the second client device CD2 may be Network Attached Storage (NAS). The second client device may support NFC in order to provide seamless content transmission between devices through a simple user operation. That is, as described above, the communication unit 260 of the second client device CD2 may include an NFC device. If two devices support NFC transmission, a queue request may be easily transmitted through a simple contact between an NFC reader and an NFC tag without a complicated setup process of a user.

In accordance with an embodiment of the present invention, while browsing a content list, the first client device CD1 may select content to be added to the queue of the second client device CD2. For example, the first client device CD1 may receive a list of pieces of content to be downloaded from the content server CS and request a single piece or a plurality of pieces of contents, included in the received list, to be downloaded.

In accordance with an embodiment of the present invention, first, the first client device CD1 sends a content downloading request (or a queue request) to the second client device CD2 (S710). In this case, the first client device CD1 may send the content downloading request using NFC. The first client device CD1 may send the content downloading request through NFC by generating a magnetic field of 13.56 MHz. The content downloading request may include downloading-related information. The downloading-related information may include downloading-related information, including information about the source URI of downloading content and information about a downloading time and wake-up time. The information about the source URI may be information about the source URI of any one piece of or a plurality of pieces of content selected from the list received from the content server CS. Furthermore, the downloading time is indicative of a period in which downloading set by a user or application is available. For example, if the downloading time is set to 10 PM~6 AM, it means that downloading attempts and downloading needs to be performed within the corresponding period. The wake-up time is indicative of a period in which the second client device CD2 in sleep mode are allowed to wake up and download content related to a downloading request from the content server CS. According to circumstances, the wake-up time may be indicative of a period in which the first client device CD1 should wake up from sleep mode, that is, a period in which the second client device CD2 should send a wake-up request to the first client device CD1. This may be clearly defined through a configuration. The downloading-related information may further include information related to the transmission of the content downloading request (queue request). The content downloading request may further include information related to NFC and information about reception conditions of downloading content, which are described later.

After the first client device CD1 sends the content downloading request, the second client device CD2 may send a confirmation message for the downloading request to the first client device CD1 (S712). The confirmation message may be an automatic notification message for the queue request state of the second client device CD2. The second client device CD2 capable of NFC may receive the queue request from the first client device CD1 through the medium of an NFC interface and may send a message, indicating that the content downloading request has been successfully received, to the first client device CD1. The confirmation message may include information indicating that the second client device CD2 will start downloading. Alternatively, acknowledge for the start of downloading may be transmitted independently of the confirmation message. The confirmation message may also be transmitted through NFC.

When receiving the confirmation message, the first client device CD1 may enter sleep mode. Sleep mode is a mode in which the first client device CD1 operates in the least power consumption state in order to minimize battery consumption. While the second client device CD2 performs downloading, a user may want the power consumption of the first client device CD1 to be minimized. Accordingly, when the confirmation message is received from the second client device CD2, the first client device CD1 may enter sleep mode in order to minimize the power consumption of the first client device CD1 until downloading is completed. In this case, the first client device CD1 may enter sleep mode in response to an entry command into sleep mode. In such a case, the oscillator of a device may be turned off, and any system clock may not be generated in the device. However, the input/output (I/O) port of the device may remain in a state right before sleep mode. Sleep mode may be divided into several stages according to setting. That is, sleep mode may support sleep mode in which the contents of memory in a current state, including an open program or document, are maintained, sleep mode in which a current state stored in memory is set to a hard disk and the memory does not maintain a current state, and sleep mode in which a current state is stored only in memory when mode switches to sleep mode, but contents are not copied to a hard disk like standby mode in Windows. This may be selected by a user through a system environment configuration. Sleep mode may switch to active mode in response to a specific timer or in response to the reception of a wake-up command from the outside. Active mode is a mode in which a device not in sleep mode normally operates.

After receiving the content downloading request, the second client device CD2 may download a content asset from the content server CS. The second client device CD2 may have held a list of content to be downloaded in its queue in response to the downloading request. Thereafter, the second client device CD2 may download a content-related file, included in the list, from the content server CS. In this case, the second client device CD2 may perform downloading on a downloading time included in the downloading request.

After the second client device CD2 completes the downloading of content related to the downloading request of the first client device CD1, the second client device CD2 may wake the first client device CD1 up through NFC (S714). This may be performed by sending a wake-up request. The wake-up request, as described above, may be made based on a wake-up time included in the content downloading request. In this case, if communication using NFC is impossible, the wake-up request may be transmitted using another detailed network interface, for example, 3G/4G or a WLAN. Whether NFC communication is impossible or not may be determined by determining whether a confirmation message for a wake-up request transmitted through NFC is received within a set reference time. For example, if a confirmation message reception time for an NFC wake-up request is set to 1 minute, NFC communication is determined to be impossible if the confirmation message is not received within the 1 minute after the wake-up request is transmitted, and the wake-up request may be transmitted over another wireless communication network.

After receiving the wake-up request, the first client device CD1 wakes up. That is, the first client device CD1 switches from sleep mode to active mode. Thereafter, the first client device CD1 may send a confirmation message for wake-up to the second client device CD2 (S716). The confirmation message for wake-up may include information that requests the asset of the downloaded content to be transmitted. Alternatively, the first client device CD1 may separately send a message that requests the asset to be transmitted. In this case, the first client device CD1 may determine whether it is able to receive the downloaded content asset by comparing downloaded content reception conditions, related to a power connection status, a battery status, a network status, and the state of an available storage space set through a user interface, with its own power connection status, battery status, network status, and state of an available storage space. The first client device CD1 may determine whether or not to send a message that requests the downloaded content asset to be transmitted based on a result of the comparison.

In another case, after receiving the confirmation message, the second client device CD2 may determine whether or not to send the downloaded content asset based on information about downloaded content reception conditions that are included in the content downloading request and that are related to the power connection status, battery status, network status, and state of the available storage space of the first client device CD1. That is, the second client device CD2 may determine whether or not to send the downloaded content asset to the first client device CD1 by comparing the power connection status, battery status, network status, and state of the available storage space of the first client device CD1 with the downloaded content reception conditions. In this case, information about the current power connection status, battery status, network status, and state of the available storage space of the first client device CD1 may be separately transmitted or may be included in the content downloading request and transmitted.

In yet another case, the second client device CD2 may determine whether the first client device CD1 is able to receive the downloaded content asset based on the size of the downloaded content asset and information about the current power connection status, battery status, network status, and state of the available storage space of the first client device CD1. Furthermore, the second client device CD2 may determine whether or not to send the downloaded content asset based on a result of the determination.

In further yet another case, the second client device CD2 may determine whether or not to send the downloaded content asset by comparing its own current power connection status, battery status, network status, and state of an available storage space with the size of the downloading content asset and at least one of a battery and communication resources consumed for transmission.

A determination of the reception/transmission of the downloaded content asset from/to a plurality of the first client devices CD1 may be controlled by the setting of the first client device CD1. The setting information may be included in the content downloading request.

The first client device CD1 may provide notification that the queue request has been executed through a user interface.

The asset of the content downloaded to the second client device CD2 is prepared to be transmitted from the second client device CD2 to the first client device CD1. If a user selects local downloading, the selected asset is transmitted from the second client device CD2 to the first client device CD1 (S718).

The entire downloading process may be automatically performed when a file to be downloaded is selected in the first client device CD1 and the first client device CD1 is placed within a specific radius of the second client device CD2. That is, the first client device CD1 may perform control so that the content downloading request (i.e., the queue request) is automatically transmitted to the second client device CD2 through user setting. The user of the first client device CD1 may control setting related to the use of storage for an automatic queue request and automatic downloading, to a downloading period, and to the use of power/battery.

After receiving the automatic content downloading request through NFC, the second client device CD2 may automatically download the content and automatically send the downloaded content to the first client device CD1. This may be considered that downloading using a DLNA has been supplemented.

The content downloading request may support network interface information for simplifying or automating NFC link set-up and a related protocol. Furthermore, NFC-related information may include at least one of device wake-up policy information for NFC and information that is related to an automatic Device to Device (D2D) notification message for a content downloading request event (e.g., the content downloading request event may include a done and stop event).

In this case, the network interface information for simplifying or automating NFC link set-up may be added to information about a plurality of communication network types (e.g., a LAN, a WLAN, 2G, 3G, 4G (including Wimax), a USB, and UPnP) supported by a client device. When the intermediate device manager 124 of the first client device CD1 discovers the second client device CD2 through NFC, the NFC information of the second client device CD2 including information about an NFC type (may include information about an NFC mode and a Tag ID) may be listed in a recently connected device list. Furthermore, the intermediate device manager 124 may add detailed NFC information about a queue/policy engine NFC type, mode, and TagID as follows.

```
<!- NFC Tag Type: Type 1/2/3/4 Tag Operation (Published v1.0 for
1-3, v2.0 for 4,
Devices WG of NFC Forum)-> <xs:attribute name=ͺ NFCTypeͺ
type="xs:string"/>
<!- NFC Mode: Card Emulation, Peer-to-Peer, Read-Write mode
defined by NFC
Forum -->
<xs:attribute name=ͺ NFCModeͺ type="xs:string"/>
<!- NFC Tag ID ->
<xs:attribute name=ͺ NFCIDͺ type="xs:string"/>
```

In this case, types 1/2/3/4 included in the NFC tag type information "NFCType" are types described in v1.0 or v2.0 related to the device WG of the NFC forum. An RF interface, speed, and protocol may be differently defined depending on the type. Furthermore, the NFC mode information "NFC-Mode" may be card emulation mode, peer-to-peer mode, or read-write mode defined in the NFC forum. In this case, card emulation mode may be a mode in which recognition is always performed by a reader irrespective of the on/off of a terminal. Peer-to-peer mode may be a mode in which two NFC mobile phones operate as card readers and exchange data. Read-write mode may be a mode in which a mobile phone recognizes RFID tag information in an NFC activation state and thus operates as a card reader. Furthermore, the NFC tag ID information "NFCID" is indicative of information about an ID on which an NFC tag is able to be identified.

Furthermore, the content downloading request may include at least any one of power connection status information, battery status information, network status information, and available storage space information that are pieces of information related to conditions in which the first client device CD1 receives downloaded content when the second client device CD2 completes downloading. For example, the content downloading request may include information about whether power is connected or not and information about the amount of remaining battery power. Furthermore, the network status information may provide information about whether a local distance network is currently connected or whether a 3G/4G wireless network is currently connected. The available storage space information provides information regarding that how much is an available storage space currently allocated to a device. The content downloading request may include setting information about whether downloading content has been received depending on a power connection status, a battery status, a network status, and the state of an available storage space. For example, setting may be performed so that downloading content is received from the second client device CD2 only when power is connected and then transmitted. Furthermore, setting may be performed so that downloading content is received only when a battery status is a specific value (e.g., 30%) or higher. Such setting information may be previously set as default information, and a user may directly change the setting through a user interface.

Figure 8:
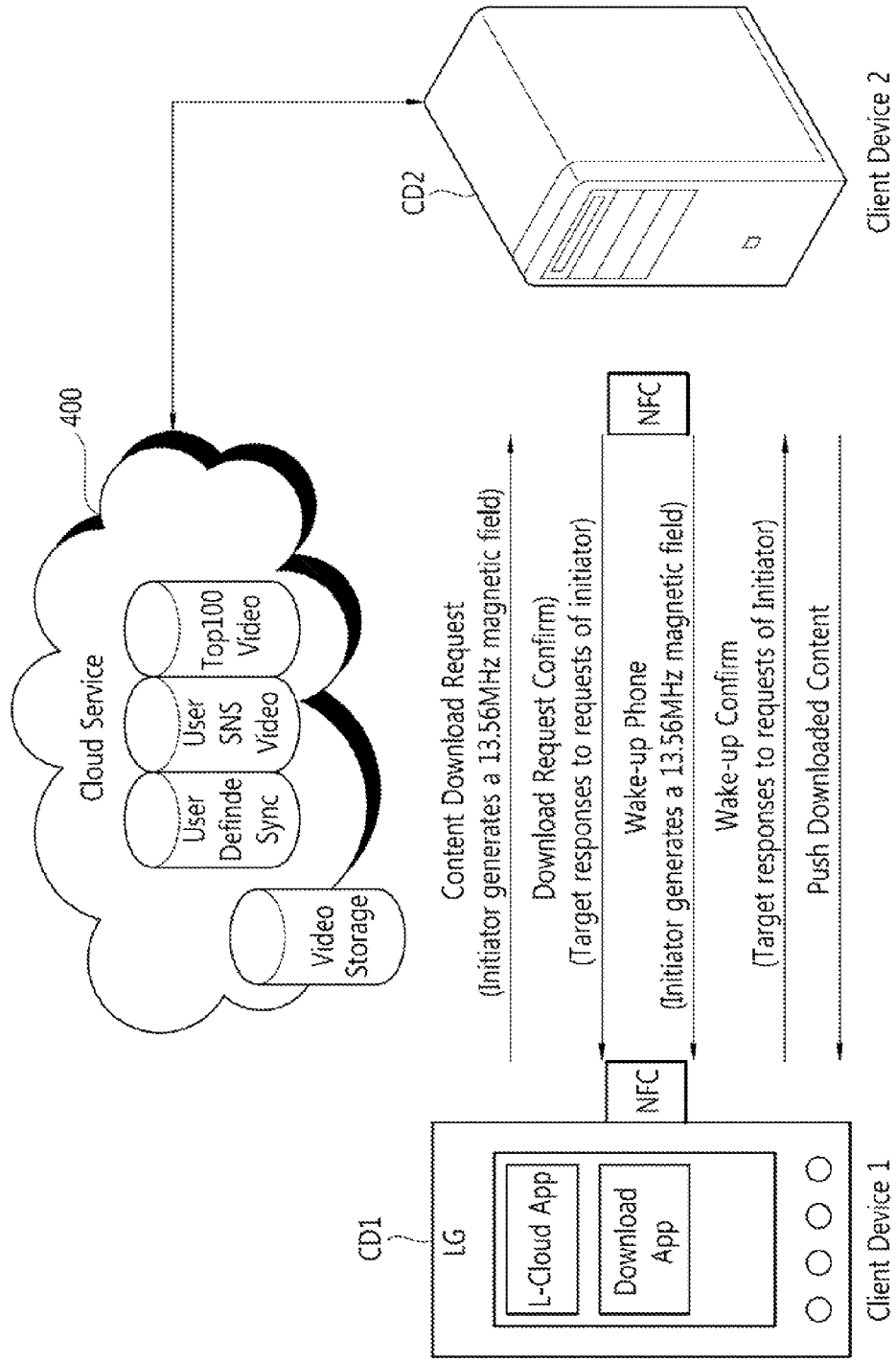
FIG. 8 is a diagram illustrating a flow of signals transmitted and received between a first client device, a second client device, and a cloud service server in the content downloading method using NFC in accordance with another embodiment of the present invention.

FIG. 8 is a diagram illustrating a flow of signals transmitted and received between a first client device CD1, a second client device CD1, and a cloud service server 400 in the content downloading method using NFC in accordance with another embodiment of the present invention.

Referring to FIG. 8, the first client device CD1 may use the cloud service server 400 when sending and receiving a content downloading request, the confirmation message of the content downloading request, a wake-up request, the confirmation message of the wake-up request, and downloading content to and from the second client device CD2. A cloud service is a service in which when a user stores information through a mobile device, stores information through a PC, stores information through a web, and stores information in any format or type, the information is autonomously stored in a sharing folder and can be retrieved at anytime and anywhere. A server that manages the cloud service is the cloud service server 400. In such a cloud service, if a specific folder is designated, the folder becomes a sharing folder and may be automatically synchronized with devices related to the cloud service. The cloud service server 400 may include video storage and store content to be downloaded in the video storage.

After receiving a content downloading request, the second client device CD2 requests content to be downloaded from the cloud service server 400. The cloud service server 400 may previously download a requested content file from a content server CS or synchronize the requested content file. According to circumstances, if the cloud service server 400 is able to identify an asset to be downloaded, the cloud service server 400 does not download the asset from a content server CS, but may provide a downloading link (e.g., a source URI) to the asset to be downloaded. The second client device CD2 may receive the requested content from the cloud service server 400. Thereafter, the second client device CD2 may send a wake-up request to the first client device CD1. The first client device CD1 that has received the wake-up request may wake up from sleep mode and then receive the downloaded content from the second client device CD2. Alternatively, the first client device CD1 may be provided with the content through synchronization with the cloud service server 400.

Figure 9:
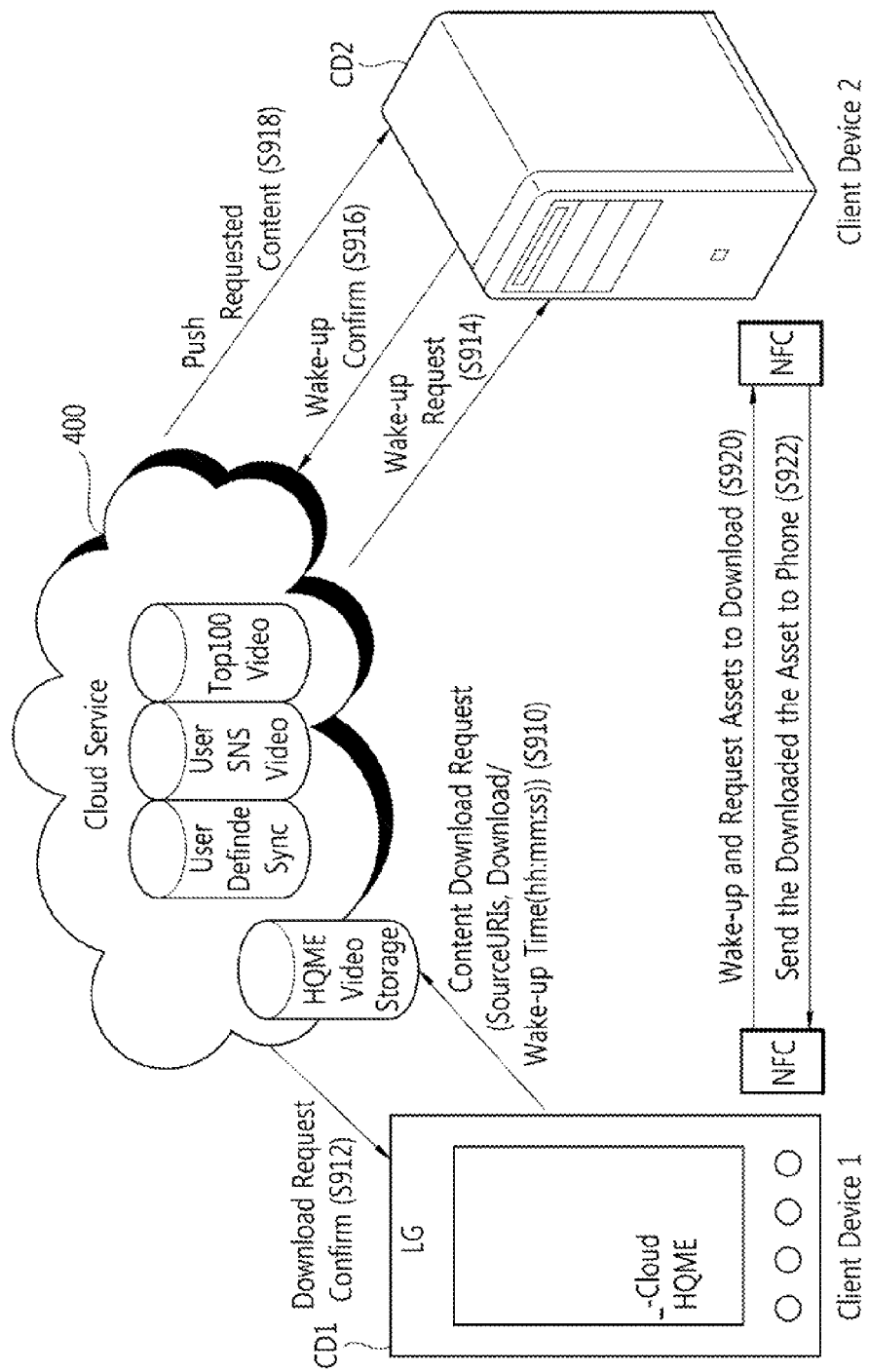
FIG. 9 is a diagram illustrating a flow of signals transmitted and received between a first client device, a second client device, and a cloud service server in a method for downloading content in accordance with another embodiment of the present invention.

FIG. 9 is a diagram illustrating a flow of signals transmitted and received between a first client device CD1, a second client device CD1, and a cloud service server 400 in a method for downloading content in accordance with another embodiment of the present invention.

Referring to FIG. 9, the first client device CD1 may send a content downloading request to the cloud service server 400 (S910). For example, if the second client device CD2 is unavailable (e.g., when the second client device CD2 is in sleep mode, when the power of the second client device CD2 is off, or when a network interface is down), the queue/policy engine 120 of the first client device CD1 may send the content downloading request (queue request) through a designated cloud service. As described above, the content downloading request may include a source URI and information about a downloading/wake-up time. In this case, the downloading time is time when downloading set by a user or application is available. The information about a wake-up time is time during which the second client device CD2 in sleep mode wakes up and performs downloading.

Such a use case may be advantageous for file synchronization between the client devices CD1 and CD2 and a cloud service. If the second client device CD2 is in sleep mode, the first client device CD1 may send the content downloading request to the cloud service server 400, and the cloud service server 400 may wake the second client device CD2 up on a downloading/wake-up time. The cloud service server 400 may select an asset recommended through a corresponding algorithm. Thereafter, the cloud service server 400 may send the content downloading request to the second client device CD2 on behalf of a user. For an automatic queue request and automatic downloading, a user may control setting related to the use of storage, a downloading period, and the use of power/battery.

The cloud service server 400 that has received the content downloading request may send the confirmation message of the content downloading request to the first client device CD1 (S912). The first client device CD1 that has received the confirmation message may enter sleep mode in order to reduce power consumption. The cloud service server 400 may download the asset of the content to be downloaded based on the content downloading request.

The cloud service server 400 may send a wake-up request to the second client device CD2 (S914). The second client device CD2 that has received the wake-up request switches from sleep mode to active mode by performing wake-up.

The second client device CD2 may send the confirmation message of the wake-up request (S916).

The cloud service server 400 that has received the confirmation message may send the requested content to the second client device CD2 (S918). That is, the cloud service server 400 may directly send (push) the content in a cloud service. According to circumstances, the content downloading request may be assumed to be transmitted to the second client device CD2 through NFC as well as to the cloud service server 400. In such a case, the asset of content to be downloaded may be downloaded to the second client device CD2 and the cloud service server 400. If the cloud service server 400 is able to identify an asset to be downloaded, the cloud service server 400 does not download the asset from a content server CS, but may provide a downloading link (e.g., a source URI) to the asset to be downloaded.

When the downloading of the content is completed, the second client device CD2 sends a wake-up request to the first client device CD1. The wake-up request may be made through NFC. The first client device CD1 that has received the wake-up request wakes up, switches to active mode, and then requests the asset in order to download the asset (S920). A request for the asset may also be made through NFC. If the confirmation message of the wake-up request transmitted through NFC is not received within a reference time, the second client device CD2 may send the wake-up request over another wireless communication network, such as a WLAN or 3G/4G.

The second client device CD2 may send the asset of the downloaded content to the first client device CD1 (S922). Alternatively, the first client device CD1 may receive the downloaded content through the synchronization function of a cloud service.

Figure 10:
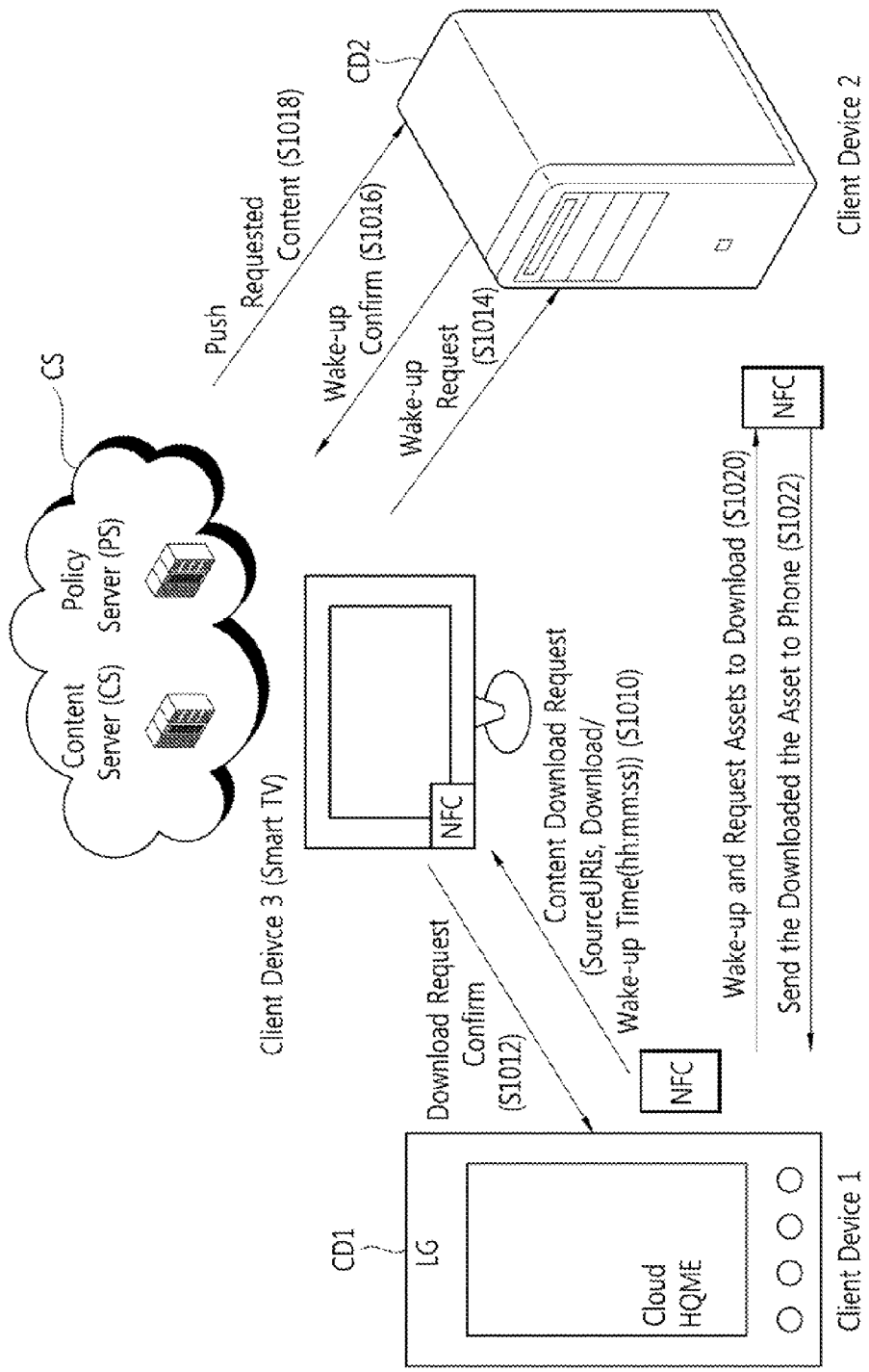
FIG. 10 is a diagram illustrating a flow of signals transmitted and received between a first client device, a second client device, a third client device, and a content server in the content downloading method in accordance with another embodiment of the present invention.

FIG. 10 is a diagram illustrating a flow of signals transmitted and received between a first client device CD1, a second client device CD2, a third client device CD3, and a content server CS in the content downloading method in accordance with another embodiment of the present invention. In this case, the third client device CD3 means another client device other than the first and the second client devices CD1 and CD2 and may include the cloud service server 400. The third client device CD3 may be another electronic device (e.g., smart TV) included in the same home network and may be capable of NFC communication.

Referring to FIG. 10, the first client device CD1 sends a content downloading request to the third client device CD3 capable of NFC through the medium of an NFC interface (S1010). Thereafter, the third client device CD3 that has received the content downloading request sends the confirmation message of the content downloading request to the first client device CD1 through the medium of the NFC interface (S1012). In this case, the third client device CD3 may forward the content downloading request to the second client device CD2 so that the second client device CD2 subsequently downloads a content asset from the content server CS (S1014). That is, the third client device CD3 may function as the intermediary of the content downloading request. In this case, if the third client device CD3 includes a storage device (e.g., a USB drive, an HDD, or flash memory), the third client device CD3 may directly download an asset from the content server CS to its storage device.

Next, the second client device CD2 that has received the content downloading request from the third client device CD3 downloads the asset of the requested content from the content server CS (S1016). Thereafter, the third client device CD3 and the second client device CD2 exchange the states of the content downloading requests (S1018). Thereafter, the second client device CD2 sends a wake-up request to the first client device CD1. The wake-up request may be made through NFC. The first client device CD1 that has received the wake-up request wakes up, switches to active mode, and then requests the asset in order to download the asset (S1020). A request for the asset may also be made through NFC. In this case, if the confirmation message of the wake-up request transmitted through NFC is not received within a reference time, the second client device CD2 sends the wake-up request over another wireless communication network, such as a WLAN or 3G/4G.

The second client device CD2 may send the asset of the downloaded content to the first client device CD1 (S1022).

Figure 11:
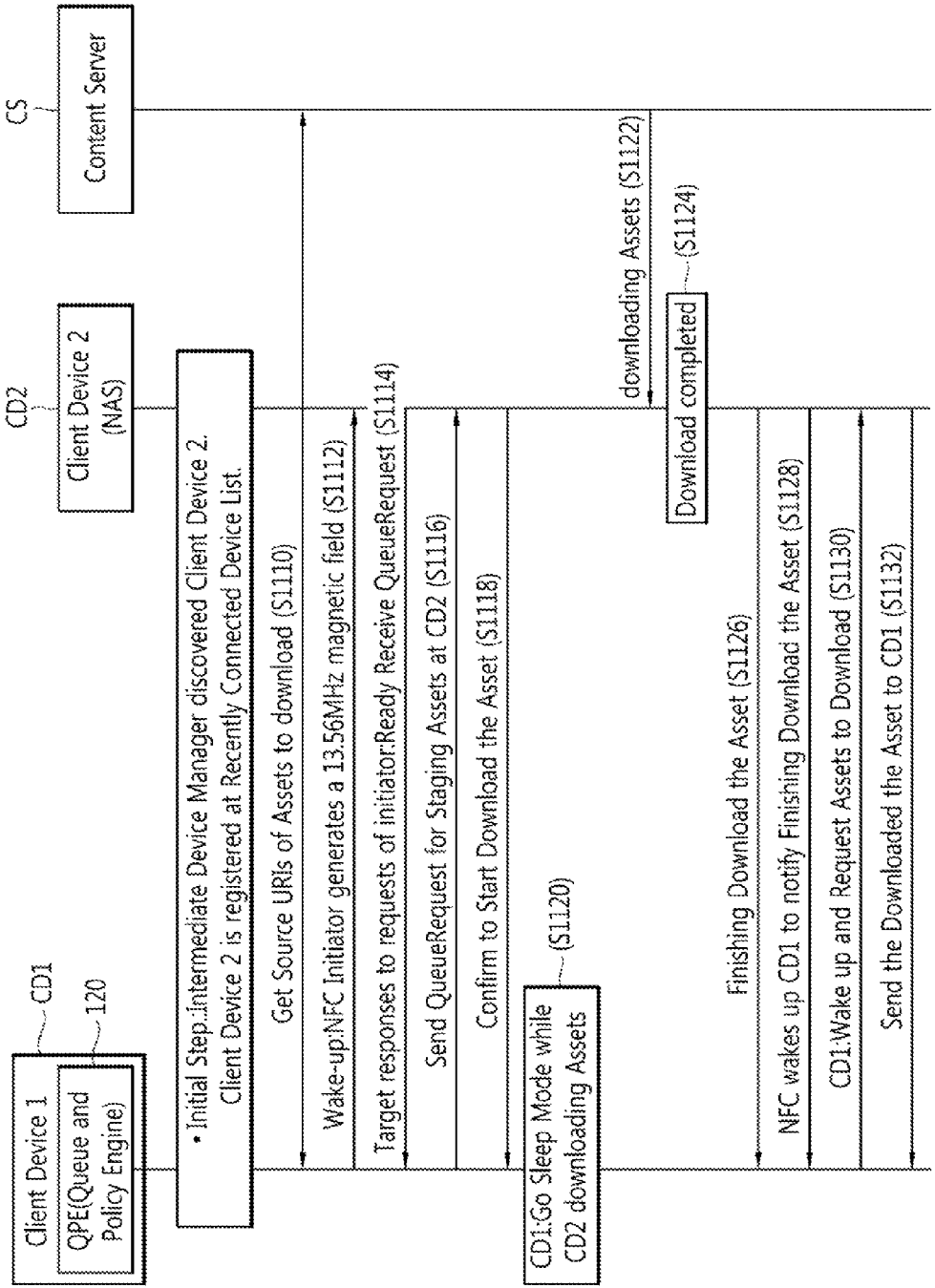
FIG. 11 is a sequence diagram of signals transmitted and received between a first client device, a second client device, and a content server in an exemplary use of the content downloading method in accordance with another embodiment of the present invention.

FIG. 11 is a sequence diagram of signals transmitted and received between a first client device CD1, a second client device CD2, and a content server CS in an exemplary use of the content downloading method in accordance with another embodiment of the present invention.

Referring to FIG. 11, the queue/policy engine 123 of the first client device CD1 manages a queue request (content downloading request) and a process of downloading content derived due to the queue request. Before sending a queue request, the intermediate device manager 124 of the first client device CD1 discovers the second client device. That is, the intermediate device manager 124 discovers accessible devices using the recently connected device list of the first client device CD1. It is assumed that the second client device CD2 has been registered with the recently connected device list. A procedure related to the recently connected device list is described later with reference to FIGS. 19 to 24.

After discovering the second client device CD2, first, the first client device CD1 obtains the source URI of content to be downloaded from the content server CS (S1110).

Thereafter, the first client device CD1 wakes the second client device CD2 up using an NFC interface (S1112). Such wake-up may be performed in such a way as to send a wake-up request.

The second client device CD2 that has received the wake-up request may send a response to the wake-up request to the first client device CD12 (S1114). The response may include information indicating that the second client device CD2 has been prepared to receive a queue request.

The first client device CD1 that has received the response to the wake-up request sends a queue request for storing an asset in the second client device CD2 to the second client device CD2 (S1116). The queue request may include downloading-related information including the source URI. Furthermore, the queue request may include at least one of network interface information for simplifying or automating NFC link set-up and a related protocol, device wake-up policy information for NFC, and information related to an automatic Device to Device (D2D) notification message for a content downloading request event (e.g., the content downloading request event may include a done and stop event), that is, NFC-related information. Furthermore, the content downloading request may include at least one of power connection status information, battery status information, network status information, and available storage space information, that is, information related to the downloaded content reception conditions of the first client device CD1 when the second client device CD2 completes downloading.

The second client device CD2 that has received the queue request checks the queue request and sends a confirmation message indicating that it will start downloading the asset to the first client device CD1 (S1118).

When the first client device CD1 receives the confirmation message from the second client device CD2, it enters sleep mode while the second client device CD2 downloads the content (S1120). In this case, setting may be performed as follows. A specific time may be set, and the first client device CD1 may wake up from sleep mode in response to a timer event, or the first client device CD1 may wake up when it receives a wake-up request from the second client device CD2. Such setting information may be included in the queue request.

The second client device CD2 downloads the asset of the content downloaded from the content server CS (S1122). The second client device CD2 may search for a corresponding address based on the source URI included in the queue request and download the content.

When the downloading is completed (S1124), the second client device CD2 may notify the first client device CD1 that the downloading of the asset of the content to be downloaded has been completed (S1126). In this case, the second client device CD2 does not send a separate completion message, but may send a wake-up request to the first client device CD1 through NFC in order to provide notification that the second client device CD2 has completed the downloading (S1128).

If the first client device CD1 receives the wake-up request through an NFC interface, it performs wake-up, switches from sleep mode to active mode, and requests the asset in order to download the downloaded content (S1130). In this case, the first client device CD1 may determine whether or not to send a request for the asset by determining whether or not to receive the downloaded content based on its own status information (e.g., a power connection status, the amount of remaining battery power, a network status, and the state of an available storage space). If such reception conditions are satisfied, the first client device CD1 may send the asset request to the second client device CD2. If the reception conditions are not satisfied, the first client device CD1 may not send the asset request to the second client device CD2 in the state in which the downloaded content has been stored in the second client device CD2 only.

If the first client device CD1 wants downloading, the second client device CD2 may send the downloaded content to the first client device CD1 (S1132). In this case, if setting information related to the reception conditions of the downloaded content and information about the current reception status of the first client device are included in the queue request, the second client device CD2 may determine whether or not to send the downloaded content based on the setting information. Furthermore, the second client device CD2 may determine whether or not to send the downloaded content to the first client device CD1 by taking into consideration the size of the downloaded content, the amount of remaining power of its battery, or wireless communication resources.

Figure 12:
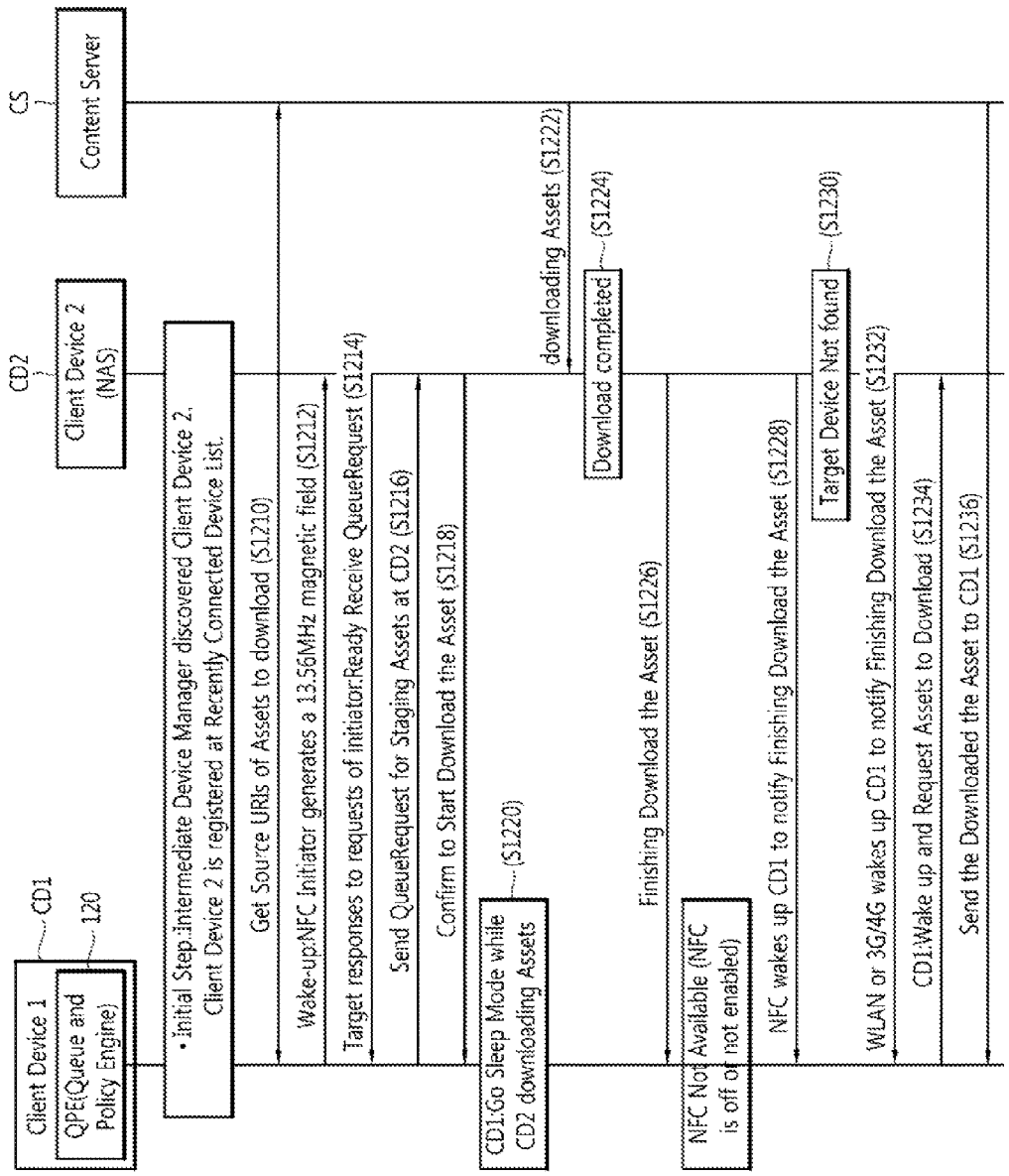
FIG. 12 is a sequence diagram of signals transmitted and received between a first client device, a second client device, and a content server in an exemplary use of the content downloading method in accordance with another embodiment of the present invention.

FIG. 12 is a sequence diagram of signals transmitted and received between a first client device CD1, a second client device CD2, and a content server CS in an exemplary use of the content downloading method in accordance with another embodiment of the present invention. In the present embodiment, if the second client device CD2 is unable to wake the first client device CD1 up through NFC after completing downloading, the second client device CD2 may wake the first client device CD1 up using a WLAN or 3G/4G wireless communication.

Referring to FIG. 12, before sending a queue request, the intermediate device manager 124 of the first client device CD1 discovers the second client device. That is, the intermediate device manager 124 discovers accessible devices using the recently connected device list of the first client device CD1. As in the embodiment of FIG. 11, it is assumed that the second client device CD2 has been registered with the recently connected device list.

After discovering the second client device CD2, first, the first client device CD1 obtains the source URI of content to be downloaded from the content server CS (S1210).

Thereafter, the first client device CD1 wakes the second client device CD2 up using an NFC interface (S1212). The second client device CD2 that has received the wake-up request may send a response to the wake-up request to the first client device CD2 (S1214). The response may include information indicating that the second client device CD2 has been prepared to receive the queue request.

The first client device CD1 that has the response to the wake-up request sends the queue request for storing an asset in the second client device CD2 to the second client device CD2 (S1216). The queue request may include at least any one of a source URI, downloading-related information including NFC-related information, setting information related to reception conditions of downloading content, and status information for the reception of the downloading content.

The second client device CD2 that has received the queue request confirms the queue request and sends a confirmation message indicating that it will start downloading the asset to the first client device CD1 (S1218).

When the first client device CD1 receives the confirmation message from the second client device CD2, it enters sleep mode while the second client device CD2 downloads the content (S1220). In this case, setting may be performed as follows. A specific time may be set, and the first client device CD1 may wake up from sleep mode in response to a timer event, or the first client device CD1 may wake up when it receives a wake-up request from the second client device CD2. Such setting information may be included in the queue request.

The second client device CD2 downloads the asset of the content downloaded from the content server CS (S1222). The second client device CD2 may search for a corresponding address based on the source URI included in the queue request and download the content.

When the downloading is completed (S1224), the second client device CD2 may notify the first client device CD1 that the downloading of the asset of the content to be downloaded has been completed (S1226). In this case, the second client device CD2 does not send a separate completion message, but may send a wake-up request to the first client device CD1 through NFC in order to provide notification that the second client device CD2 has completed the downloading (S1228). The wake-up request may include information indicating that downloading has been completed.

Assuming that the first client device CD1 is incapable of NFC communication, the confirmation message of the wake-up request through the NFC interface may not be received for a reference time. That is, if a response to the wake-up request is not received for the reference time, the second client device CD2 may determine that a target device using NFC has not been discovered (S1230).

Accordingly, the second client device CD2 sends a wake-up request to the first client device CD1 through a WLAN or 3G/4G wireless communication in order to provide notification that the asset has been downloaded (S1232). In this case, the second client device CD2 may perform wake-up through an UPnP or DLNA.

If the first client device CD1 receives the wake-up request through a WLAN or 3G/4G wireless communication, it performs wake-up, switches from sleep mode to active mode, and requests the asset in order to download the downloaded content (S1234).

Thereafter, if the first client device CD1 wants downloading, the second client device CD2 may send the downloaded content to the first client device CD1 (S1236).

Figure 13:
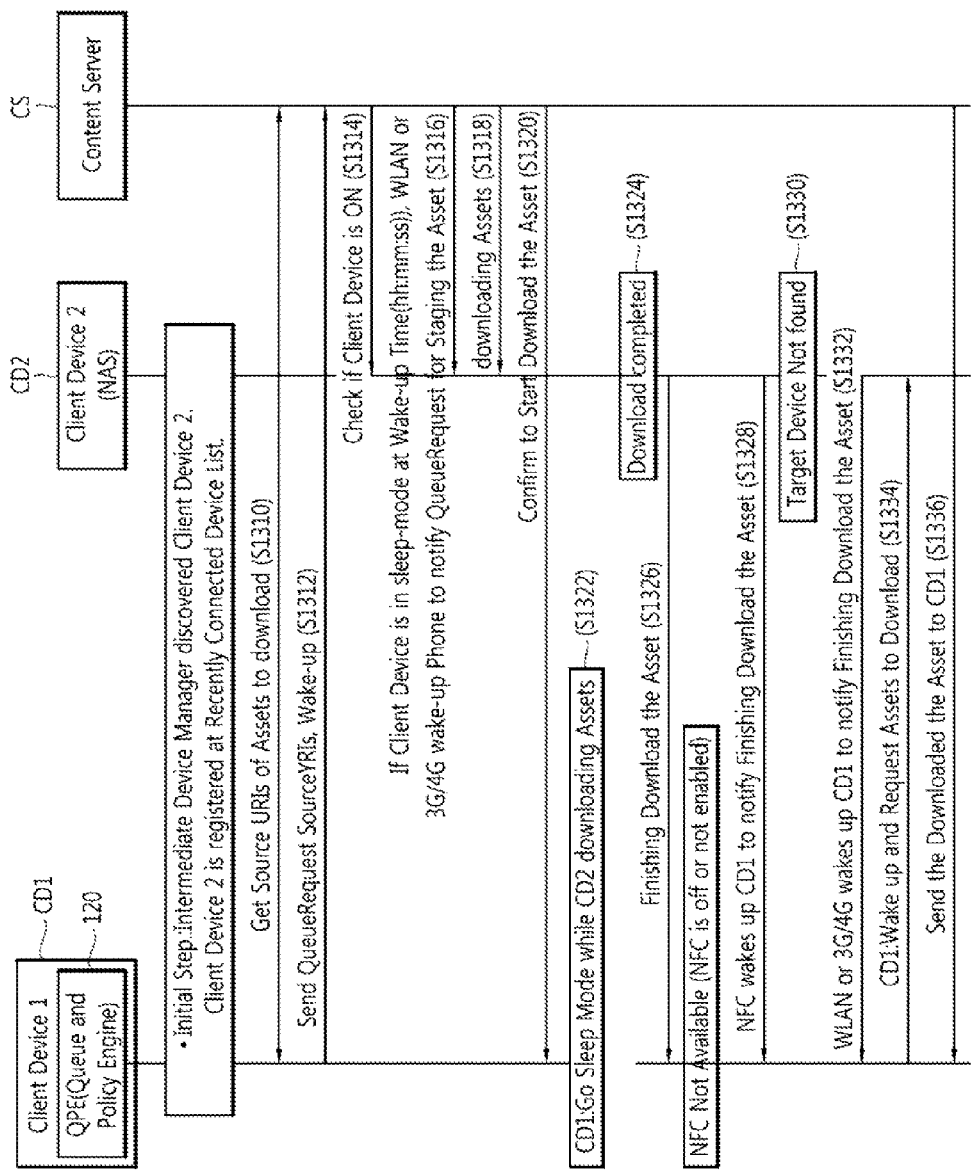
FIG. 13 is a sequence diagram of signals transmitted and received between a first client device, a second client device, and a content server in an exemplary use of the content downloading method in accordance with another embodiment of the present invention.

FIG. 13 is a sequence diagram of signals transmitted and received between a first client device CD1, a second client device CD2, and a content server CS in an exemplary use of the content downloading method in accordance with another embodiment of the present invention. In the present embodiment, the content server CS (in this case, the content server CS may be the cloud service server 400) sends a queue request to the second client device CD2. If the second client device CD2 is unable to wake the first client device CD1 up through an NFC interface after downloading, the second client device CD2 performs wake-up using a WLAN or 3G/4G.

Referring to FIG. 13, before sending a queue request, the intermediate device manager 124 of the first client device CD1 discovers the second client device. That is, the intermediate device manager 124 discovers accessible devices using the recently connected device list of the first client device CD1. As in the embodiment of FIG. 11, it is assumed that the second client device CD2 has been registered with the recently connected device list.

After discovering the second client device CD2, first, the first client device CD1 obtains the source URI of content to be downloaded from the content server CS (S1310).

Thereafter, the first client device CD1 sends a queue request for storing an asset in the second client device CD2 to the content server CS (S1312). The queue request may include at least any one of a source URI, downloading-related information including a downloading/wake-up time, NFC-related information, setting information related to reception conditions of downloading content, and status information for the reception of the downloading content.

The content server CS that has received the queue request confirms the queue request and checks whether the second client device CD2 is in an on state (S1314). That is, the content server CS checks whether the second client device CD2 is in sleep mode or is powered off.

If the second client device CD2 is in sleep mode in a wake-up time included in the queue request, the content server CS sends a wake-up request for providing notification of the queue request for storing an asset to the second client device CD2 using a WLAN or 3G/4G wireless communication network (S1316).

Thereafter, the content server CS downloads the asset to the second client device CD2 (S1318). That is, the second client device CD2 downloads the asset of the content downloaded from the content server CS. The second client device CD2 may search for a corresponding address based on the source URI included in the queue request and download the content.

In this case, the content server CS sends a confirmation message, providing notification that the downloading of the asset has been started, to the first client device CD1 (S1320). Order of the start of the downloading and order of the transmission of the confirmation message may be changed.

When the first client device CD1 receives the confirmation message from the content server CS, it enters sleep mode while the second client device CD2 downloads the content (S1322). In this case, setting may be performed as follows. A specific time may be set, and the first client device CD1 may wake up from sleep mode in response to a timer event, or the first client device CD1 may wake up when it receives a wake-up request from the second client device CD2. Such setting information may be included in the queue request.

When the downloading is completed (S1324), the second client device CD2 may notify the first client device CD1 that the downloading of the asset of the content to be downloaded has been completed (S1326). In this case, the second client device CD2 does not send a separate completion message, but may send a wake-up request to the first client device CD1 through NFC in order to provide notification that the second client device CD2 has completed the downloading (S1328). The wake-up request may include information indicating that downloading has been completed.

Assuming that the first client device CD1 is incapable of NFC communication, the confirmation message of the wake-up request through the NFC interface may not be received for a reference time. That is, if a response to the wake-up request is not received for the reference time, the second client device CD2 may determine that a target device using NFC has not been discovered (S1330).

Accordingly, the second client device CD2 sends a wake-up request to the first client device CD1 through a WLAN or 3G/4G wireless communication in order to provide notification that the asset has been downloaded (S1332).

If the first client device CD1 receives the wake-up request through a WLAN or 3G/4G wireless communication, it performs wake-up, switches from sleep mode to active mode, and requests the asset in order to download the downloaded content (S1334).

Thereafter, if the first client device CD1 wants downloading, the second client device CD2 may send the downloaded content to the first client device CD1 (S1336).

Figure 14:
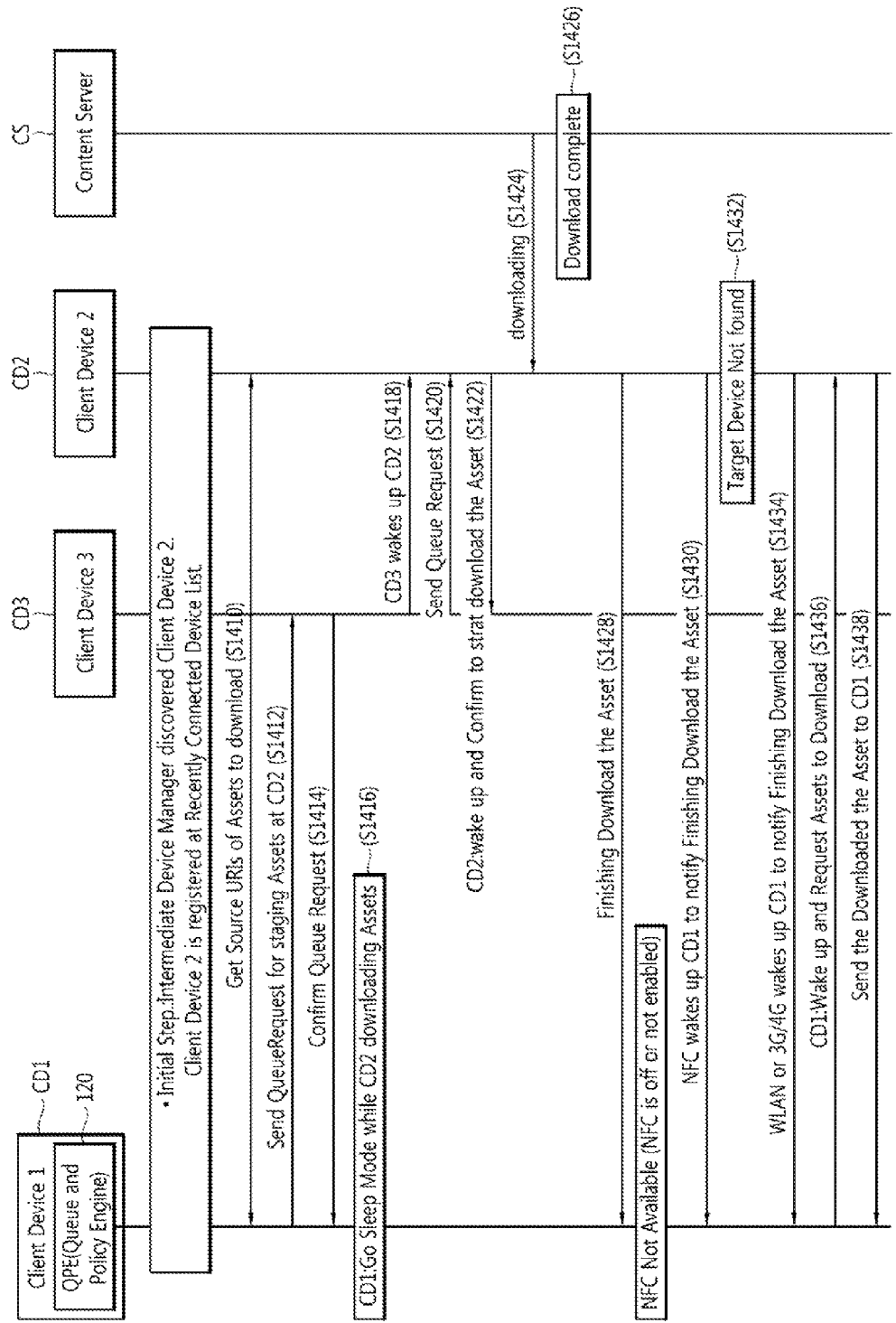
FIG. 14 is a sequence diagram of signals transmitted and received between a first client device, a second client device, a third client device, and a content server in an exemplary use of the content downloading method in accordance with another embodiment of the present invention.

FIG. 14 is a sequence diagram of signals transmitted and received between a first client device CD1, a second client device CD2, a third client device CD3, and a content server CS in an exemplary use of the content downloading method in accordance with another embodiment of the present invention. In the present embodiment, the third client device CD3 relays a queue request to the second client device CD2.

Referring to FIG. 14, before sending a queue request, the intermediate device manager 124 of the first client device CD1 discovers the second client device. That is, the intermediate device manager 124 discovers accessible devices using the recently connected device list of the first client device CD1. As in the embodiment of FIG. 11, it is assumed that the second client device CD2 has been registered with the recently connected device list After discovering the second client device CD2, first, the first client device CD1 obtains the source URI of content to be downloaded from the content server CS (S1410).

Thereafter, the first client device CD1 sends a queue request for storing an asset in the second client device CD2 to the third client device CD3 (S1412). The queue request may include at least any one of a source URI, downloading-related information including a downloading/wake-up time, NFC-related information, setting information related to reception conditions of downloading content, and status information for the reception of the downloading content.

The third client device CD3 that has received the queue request confirms the queue request and may send a confirmation message indicating that it has well received the queue request to the first client device CD1 (S1414).

When the first client device CD1 receives the confirmation message from the content server CS, it enters sleep mode while the second client device CD2 downloads the content (S1416).

The third client device CD3 checks whether the second client device CD2 is current in an on state. If the second client device CD2 is in sleep mode in a wake-up time included in the queue request, the third client device CD3 sends a wake-up request to the second client device CD2 using a WLAN or 3G/4G wireless communication network (S1418).

The third client device CD3 wakes the second client device CD2 up and then forwards the queue request to the second client device CD2 (S1420). After wakes up, the second client device CD2 may send a response to the queue request to the third client device CD3 (S1422).

Thereafter, the second client device CD2 downloads the asset of the content downloaded from the content server CS (S1424). The second client device CD2 may search for a corresponding address based on the source URI included in the queue request and download the content.

When the downloading is completed (S1426), the second client device CD2 may notify the first client device CD1 that the downloading of the asset of the content to be downloaded has been completed (S1428). The second client device CD2 does not send a separate completion message, but may send a wake-up request to the first client device CD1 through NFC in order to provide notification that the second client device CD2 has completed the downloading (S1438). The wake-up request may include information indicating that downloading has been completed. In relation to the downloading, although not illustrated, the second client device CD2 and the third client device CD3 may exchange the states of the queue request. For example, the second client device CD2 may exchange pieces of information about whether downloading has been done or in progress with the third client device CD3 through the queue request.

Assuming that the first client device CD1 is incapable of NFC communication, the confirmation message of the wake-up request through the NFC interface may not be received for a reference time. If a response to the wake-up request is not received for the reference time, the second client device CD2 may determine that a target device using NFC has not been discovered (S1432).

Accordingly, the second client device CD2 sends a wake-up request to the first client device CD1 through a WLAN or 3G/4G wireless communication in order to provide notification that the asset has been downloaded (S1434).

When receiving the wake-up request through a WLAN or 3G/4G wireless communication, the first client device CD1 performs wake-up, switches from sleep mode to active mode, and requests the asset in order to download the downloaded content (S1436).

Thereafter, if the first client device CD1 wants downloading, the second client device CD2 may send the downloaded content to the first client device CD1 (S1438).

Figure 15:
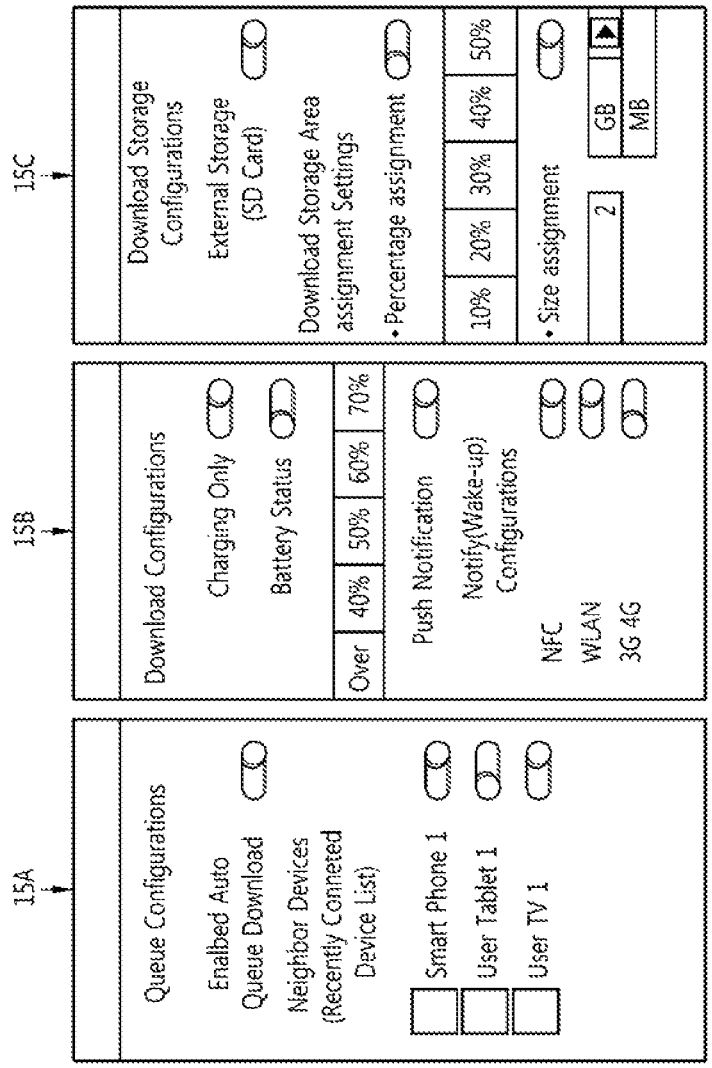
FIG. 15 is a diagram illustrating an example of a user interface in which setting may be input in relation to a client application of the content downloading method in accordance with another embodiment of the present invention.

FIG. 15 is a diagram illustrating an example of a user interface in which setting may be input in relation to a client application of the content downloading method in accordance with another embodiment of the present invention.

Referring to FIG. 15A, the first client device CD1 may control the basic setting of a client application through a User Interface (UI). First, a user may perform setting so that automatic queue downloading is enabled. For example, such enable automatic queue downloading setting may be controlled in an on/off way. If the enable automatic queue downloading setting is on, content included in the queue of a client device is automatically downloaded. In this case, a target device (e.g., it may be a second client device or an intermediate device) that has downloaded the content through automatic queue downloading based on a recently connected device list may be selected. As illustrated, the intermediate device manager 124 discovers client devices, and a smart phone 1, a user tablet 1, and a user TV 1 have been registered. A user may designate only the smart phone 1 and the user TV 1 as neighbor devices and may designate the smart phone 1 and the user TV 1 as target devices so that they download content by sending a queue request.

Referring to FIG. 15B, a user may control the downloading setting of the first client device CD1 through the user interface. This may be used to determine whether downloaded content has been received from the second client device CD2 when automatic queue downloading is executed. First, setting may be performed so that downloading is performed only when power is connected depending on a power connection status. Furthermore, setting may be performed so that downloading is performed only when a battery is charged at a specific ratio (e.g., 40%, 50%, 60%, or 70%) or higher depending on a battery status. Furthermore, notification-related setting through wake-up may be controlled depending on a network status. Whether NFC will be used, whether a WLAN or a 3G/4G wireless network will be used, or whether a plurality of network interfaces will be used may be selected. Furthermore, according to circumstances, a user may control the downloading setting of the second client device CD2 through the user interface. This may be used to determine whether the second client device CD2 performs downloading in response to a queue request based on a power connection status, a battery status, and a network status.

Referring to FIG. 15C, a user may control the downloading storage setting of the first client device CD1 through the user interface. That is, a user may allocate a downloading storage area. For example, a user may select whether or not to use external storage. For example, if external memory, such as a USB, an HDD, or flash memory, is used, a user may perform setting so that external storage is used and may select available memory. A user may perform percentage setting through downloading storage area allocation setting. In this case, even a specific ratio (percentage) of the storage of a client device may be set in order to store downloaded content. Furthermore, a user may directly input the size of storage for storing downloading content. For example, if a user sets an allocated size of 2 GB, control is performed so that downloaded content of only up to 2 GB is downloaded, but content of more than 2 GB is not downloaded. Furthermore, according to circumstances, a user may control the downloading setting of the second client device CD2 through the user interface. This may be used to determine whether the second client device CD2 performs downloading in response to a queue request based on the state of the available storage space of the second client device CD2.

Corresponding information about the details set as described above through the user interface may be included in a queue request and transmitted to the second and the third client device CD2, CD3.

The queue request is described in more detail. An exemplary data format for the queue request "QueueRequest" between the queue/policy engines 120 of client devices is as follows.

```
XML Schema:
<?xml version="1.0" encoding="UTF-8"?>
<xs:schema       xmlns:xs="http://www.w3.org/2001/XMLSchema"
elementFormDefault="qualified">
<xs:element name="QueueRequest">
<xs:complexType>
<xs:sequence>
<xs:element maxOccurs="unbounded" ref="Property"/>
</xs:sequence>
<xs:attribute name="name" use="required" type="xs:string"/>
</xs:complexType>
</xs:element>
<xs:element name="Property">
<xs:complexType mixed="true">
<xs:sequence>
<xs:element name="Policy" nillable="true" minOccurs="0"/>
</xs:sequence>
<xs:attribute name="key" use="required" type="xs:string"/>
<xs:attribute name="type" type="xs:string"/>
</xs:complexType>
</xs:element>
<xs:complexType name="RequestList">
<xs:sequence>
<xs:element maxOccurs="unbounded" ref="Property"/>
</xs:sequence>
<xs:attribute name="RequestID" use="required" type="xs:string"/>
<xs:attribute name="SourceURL" type="URLType"/>
</xs:complexType>
<xs:complexType name="PullCondition">
<xs:sequence>
<xs:element maxOccurs="unbounded" ref="Property"/>
</xs:sequence>
<xs:attribute name="ChargingStatus" type="chargingStatusType" />
<xs:attribute name="BatteryPower" type="powerLevel" />
<xs:attribute name="NetworkConnection" type="connectionTypes" />
<xs:attribute name="AvailableMinimumStorage" type="storageUsage" />
</xs:complexType>
<xs:simpleTypename="chargingStatusType">
<xs:restriction base="xs:string">
<xs:enemeration value="available"/>
<xs:enemeration value="charging"/>
<xs:enemeration value="unavailable"/>
<xs:enemeration value="error"/>
<xs:restriction>
<xs:simpleType>
<xs:simpleTypename="powerLevel">
<xs:restriction base="xs:integer">
<xs:enemeration value="0"/>
<xs:enemeration value="100"/>
<xs:restriction>
<xs:simpleType>
<xs:simpleType name="connectionType">
<xs:restriction base="xs:string">
<xs:enemeration value="WLAN"/>
<xs:enemeration value="CELL3G"/>
<xs:enemeration value="CELL4G"/>
<xs:enemeration value="NFC"/>
<xs:restriction>
<xs:simpleType>
<xs:simpleType name="storageUsage">
<xs:restriction base="xs:integer">
<xs:enemeration value="0"/>
<xs:enemeration value="100"/>
<xs:restriction>
<xs:simpleType>
<xs:schema>
```

In this case, the data format of the queue request "QueuerRequest" may include a plurality of pieces of attribute information and may include information about whether corresponding attribute information needs to be used (marked by "required" if it is required) and information about the type of attribute information.

The queue request "QueueRequest" may include "SourceURI" information (it may be represented in a string) that is at least one source URI on which content may be retrieved, "Store_Name" information (it may be represented in a string) that is a name used to store a cached object on a virtual storage device, "Type" information (it may be represented in a string) that is information about the MIME content type of a cached object as described in IETF RFC 2045, IETF RFC 2046, IETF RFC 4288, and IETF RFC 2231, and "TotalLength" information (it may be data of a long type) that is information about a cached object within a byte. In accordance with an embodiment of the present invention, the "Store_Name" may provide the name of the virtual storage device of the second client device CD2. The number of the "Type" value may be plural and may be divided and written through commas. The "TotalLength" information is mandatory if an URI describes a scheme that requires an object of a fixed size.

The queue request may further include "policy" information, that is, information about a policy structure set by calling the origin. Furthermore, the queue request may include "key" information, that is, DOMString information for identifying a key associated with a stored key.

The queue request may include "RequestID" information that is provided to a set unique ID when a request is supplied.

The queue request may further include "PullCondition" information, that is, information about reception conditions of the downloading content of the first client device CD1. More specifically, in receiving content downloaded by the second client device CD2, the first client device CD1 may determine whether or not to receive the content by performing a comparison on the state of the first client device CD1 based on the reception conditions.

The "PullCondition" information may include at least any one of "ChargingStatus" information that is information related to a power connection status, "BatteryPower" information that is battery status information, "NetworkConnection" information that is information indicative of a network connection status, and "AvailableMinimumStorage" information that is information about the status of an available storage space.

In accordance with an embodiment of the present invention, the "ChargingStatus" information may be expressed by "available", "charging", "unavailable", or "error". The "ChargingStatus" information is a capability item indicative of the charging status of a battery in relation to power connection, and a value thereof may be information of a string type. If the value of "ChargingStatus" is "available", it may mean that a battery has been installed in a device and downloading content may be received when the installed battery is working. If the value of "ChargingStatus" is "charging", it may means that a battery has been installed in a device and downloading content may be received when the battery is being charged. If the value of "ChargingStatus" is "unavailable", it may mean that downloading content may be received even when a battery is not installed in a device. If the value of "ChargingStatus" is "error", it may mean that a battery has been installed in a device and downloading content may be received although a function is not correctly performed.

Furthermore, the "BatteryPower" information may be indicative of a level of the current amount of remaining battery power. For example, if the "BatteryPower" information is "30", it may mean that downloading content is received when 30% of the current amount of remaining battery power is left. "BatteryPower" information may be expressed from "0" to "100".

Furthermore, the "NetworkConnection" information is indicative of the connection state conditions of a wireless network that is used between devices which send and receive queue requests. For example, if the "NetworkConnection" information is "CELL3G" or "CELL4G", it means that a 3G or 4G wireless network has been connected. If the "NetworkConnection" information is "WLAN", it means that a WLAN wireless network has been connected. If the "NetworkConnection" information is "NFC", content may be received only when NFC communication has been set up.

In relation to the "AvailableMinimumStorage" information, the queue request may include information, set to a specific percentage or higher of a total storage capacity, as minimum available storage space information. For example, if the "AvailableMinimumStorage" information is "40", it may mean that a storage space of 40% or more of a total storage capacity needs to be secured. The "AvailableMinimumStorage" information may be expressed from "0" to "100". Furthermore, the "AvailableMinimumStorage" information may directly include information about the size of a specific storage space. For example, if the "AvailableMinimumStorage" information is "2G", it may mean that a storage space of 2 GB is required.

The first client device CD1 or the second client device CD2 may determine whether or not to receive the asset of downloading content or send the asset of downloading content to the first client device CD1 based on such "PullCondition" information and may receive or send the asset.

The following may illustrate an embodiment added to an NFC data format which supports the queue request "QueuerRequest".

```
<?xml>
<QueueRequest>
<RequestList>
RequestID
SourceURI
<Pullcondition>
ChargingStatus
BatteryPower
NetworkConnection
AvailableMinimumStorage
</DownloadEvent>
```

The XML language is described below. A message to be delivered to the second client device CD2 through NFC may include RequestID, that is, an ID for identifying the queue request, and a source URI, that is, the URI of content to be downloaded.

Furthermore, the details of pull conditions in which the first client device CD2 will receive content when the second client device CD2 completes downloading may include at least any one of a power connection status "ChargingStatus", a battery status "BatteryPower", a network status "NetworkConnection", and an available storage space status "AvailableMinimumStorage".

The following illustrates an example of a file downloading request through the medium of NFC.

```
<?xml version="1.0" encoding="UTF-8"?>
<QueueRequest name="NFC_QueueRequest">
<RequestList
RequestID="o002"
SourceURI="http://www.example.com/asset-test.avi">
<Pullcondition>
ChargingStatus="charging"
BatteryPower="50"
NetworkConnection="NFC | WLAN"
AvailableMinimumStorage="30">
</QueueRequest>
```

In the present embodiment, the name of the queue request is "NFC_QueueRequest", RequestID that is an ID for identifying the queue request is "o002", and a source URI that is the URI of content to be downloaded is "http://www.example.com/asset-test.avi".

In accordance with an embodiment of the present invention, the "ChargingStatus" information indicates "charging" indicating that downloading content may be received in a charging status. Accordingly, the first client device CD1 does not receive the downloading content because it does not satisfy the content reception conditions if it is not in a charging status.

Furthermore, the "BatteryPower" information indicates "30" indicating that the downloading content is received only when the current amount of remaining battery power is 30%. If the amount of remaining battery power is less than 30%, the first client device CD1 may not receive the downloading content.

Furthermore, the "NetworkConnection" information is "NFC|WLAN" indicating that content is received only in the status in which a WLAN wireless network has been connected and the status in which NFC communication has been set up. Content may not be received in a network status in which a WLAN or NFC has not been connected.

The "AvailableMinimumStorage" information is set to "30". In this case, downloading content may be received only when a storage space of 30% or more of a total storage capacity is secured.

The queue request may further include NFC-related information. As described above, the NFC-related information may include NFC tag type information and NFC mode information. In this case, types 1/2/3/4 included in the NFC tag type information "NFCType" are types described in v1.0 or v2.0 related to the device WG of the NFC forum, and an RF interface, speed, and protocol may be differently defined depending on the type. Furthermore, the NFC mode information "NFCMode" may be card emulation mode, peer-to-peer mode, or read-write mode defined in the NFC forum. In this case, card emulation mode may be a mode in which recognition is always performed by a reader irrespective of the on/off of a terminal. Peer-to-peer mode may be a mode in which two NFC mobile phones operate as card readers and exchange data. Read-write mode may be a mode in which a mobile phone recognizes RFID tag information in an NFC activation state and thus operates as a card reader. Furthermore, according to circumstances, the NFC tag ID information "NFCID" may further include information about an ID on which an NFC tag is able to be identified.

Furthermore, in accordance with an embodiment of the present invention, the queue request may include the following characteristic information in relation to an asset. The queue request may include at least any one of "Asset_name" information that is the name of an asset used to store a cached object in virtual storage, "Asset_size" information indicative of the size of a cached object in bytes, "Asset-Source_URI" information that is a source URI on which an asset is retrieved using a D interface, "Asset_Origin" information that is the original that owns an asset, "Asset_Locked" information for identifying whether an asset has been locked, "Asset_Type" information that describes an MINE type of the cached object (such information may be derived from the "Type" information), "Asset_Metadata" information that is optional metadata information that may be materialized using an XML specification, "Asset_Policy" information that is an effective policy as an XML string, "Asset_Contentprofile" information that is a content profile supported by a client device, "Asset_Rightcheck" information that is right check information that needs to be performed before an active state is entered, "Asset_Validitychech" information that is VSD-specific validity check information that needs to be performed before a content asset is consumed or played back, "Asset_Playlist" information indicating that an asset belongs to a play list file, "Asset_Ismpd" information indicating that an asset is a play list of an MPD file type, "Asset_Unsolicited" information indicative of an asset not solicited by a user, "Asset_Geolocation" information indicative of at least one location accessed by a cache in order to render an asset, and "Asset_Location_Cell_ID" information indicative of at least one location where an asset is accessed by CellID.

Figure 16:
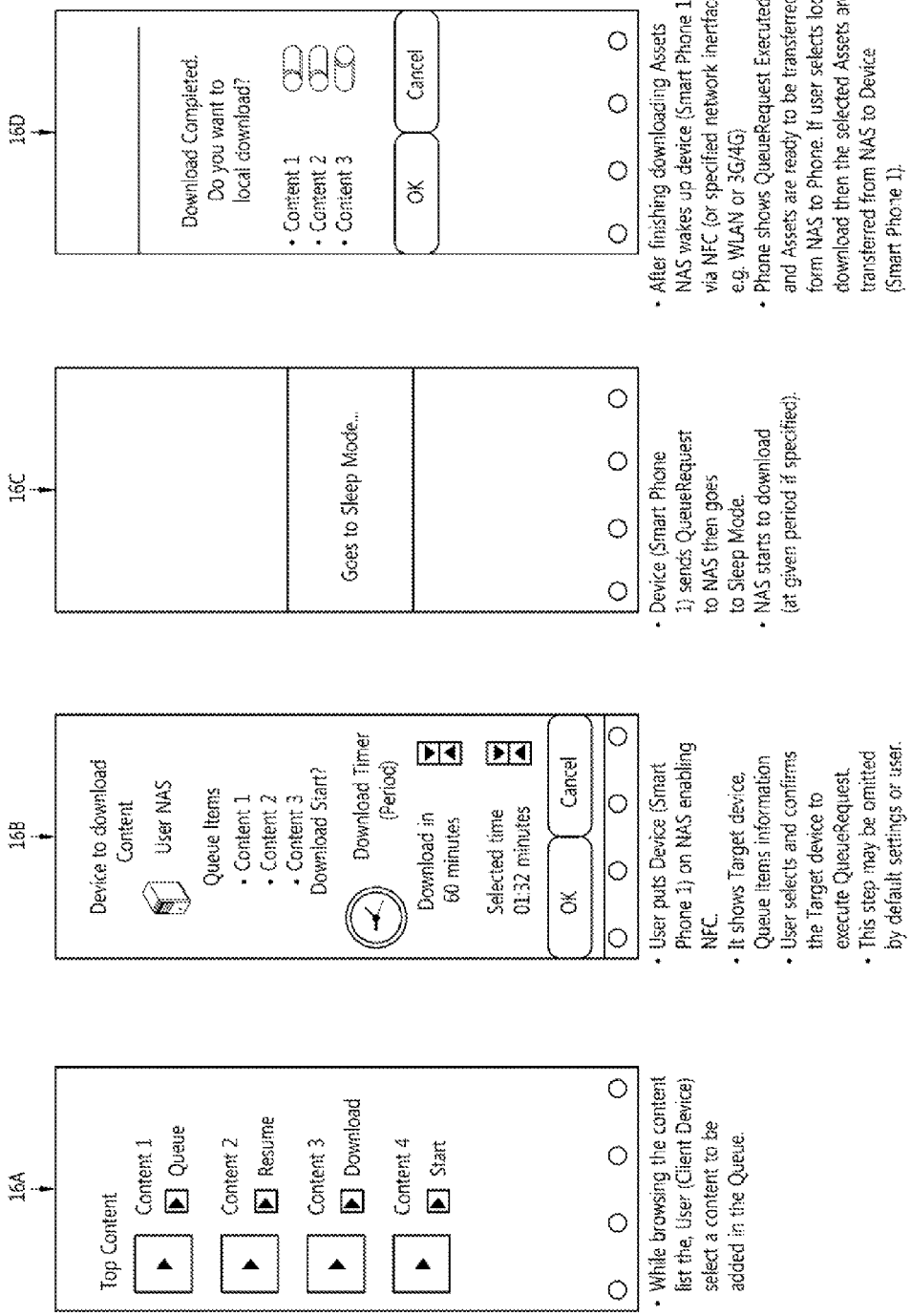
FIG. 16 is a diagram illustrating an example of a user interface in which setting related to a content list, a downloading time, and content downloading may be input through a client application of the content downloading method in accordance with another embodiment of the present invention.

FIG. 16 is a diagram illustrating an example of a user interface in which setting related to a content list, a downloading time, and content downloading may be input through a client application of the content downloading method in accordance with another embodiment of the present invention.

Referring to FIG. 16A, the first client device CD1 may browse a content list. A user may select content to be added to a queue through the user interface. In this case, priority may be assigned to content in order of higher downloading number through a web, and thus a plurality of pieces of content may be provided to the user. For example, the user may be provided with a plurality of pieces of higher-order content having the greatest downloading number during the past one week in a list form. The user may add desired content of the plurality of pieces of provided content to the queue. According to circumstances, setting may be performed so that information about the preference content of the user may be obtained through the SNS video content of the user based on a cloud service and the cloud service automatically selects recommended content.

Referring to FIG. 16B, a user may place the first client device CD1 (in the present embodiment, a smart phone 1) on the second client device CD2 capable of NFC (in the present embodiment, an NAS). Alternatively, the user may place the first client device CD1 within a specific radius where NFC is possible. In such a case, the smart phone 1 may display a target device (in the present embodiment, an NAS) and queue item information. The user selects and confirms the target device so that it executes a queue request. Such a step may be omitted by default setting or user setting (e.g., automatic queue downloading setting). That is, when the smart phone 1 is placed on the NAS, control may be performed so that the NAS automatically downloads items now included in the queue.

Referring to FIG. 16C, the first client device CD1 (in the present embodiment, the smart phone 1) sends a queue request to the second client device CD2 (in the present embodiment, the NAS) and enters sleep mode. Furthermore, the NAS starts downloading (more specifically, on a given time (e.g., a downloading/wake-up time) (if given)).

Referring to FIG. 16D, after the NAS completes the downloading of the asset of the content to be downloaded, the NAS wakes the smart phone 1 up through the medium of NFC. If the NAS is unable to perform such wake-up through NFC, it wakes the smart phone 1 up through the medium of a detailed network interface (e.g., a WLAN or 3G/4G). The smart phone 1 displays the executed queue request, and assets are prepared to be transmitted from the NAS to the smart phone 1. When a user selects local downloading, a selected asset is transmitted from the NAS to the smart phone 1.

Figure 17:
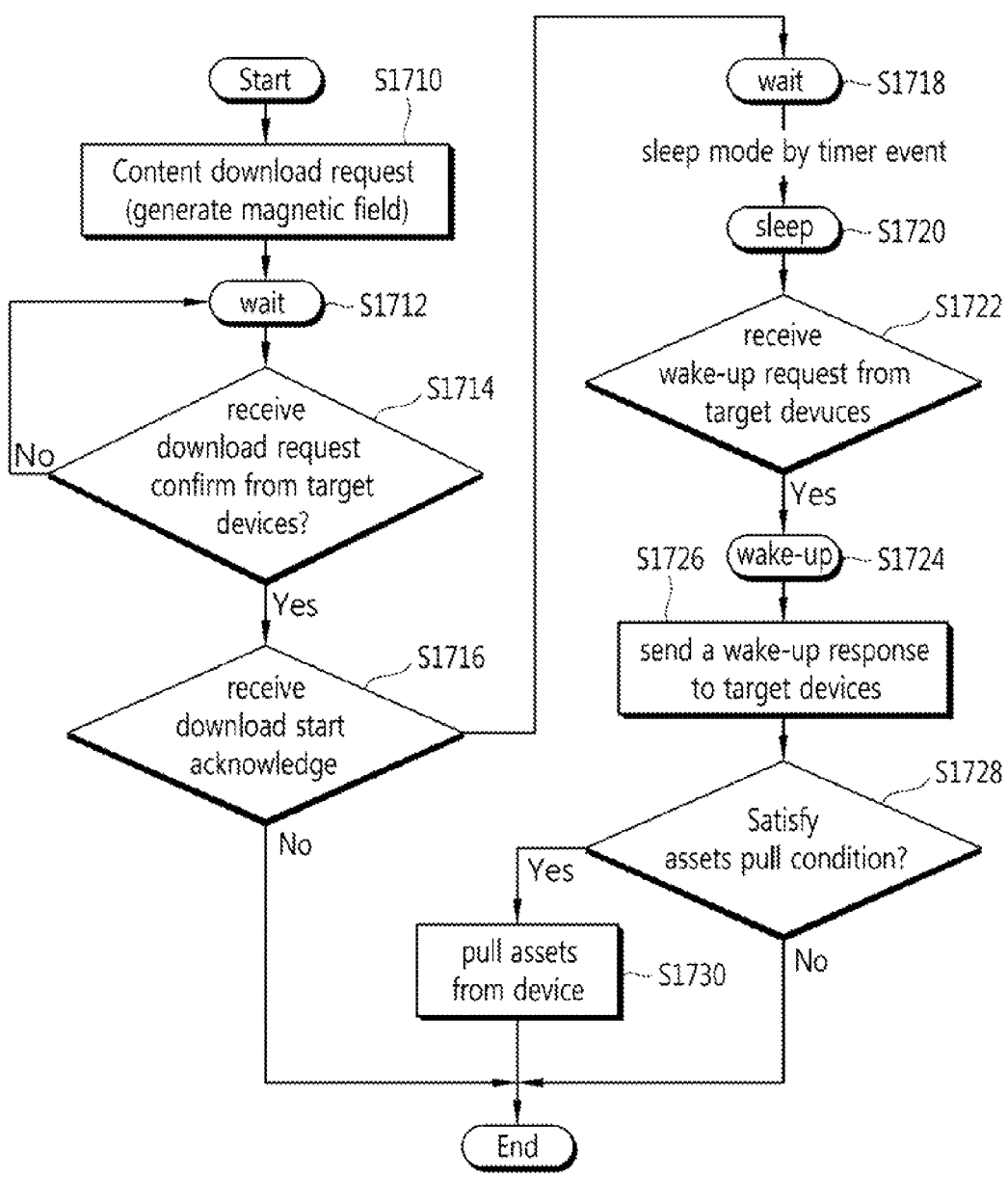
FIG. 17 is a flowchart schematically illustrating an operation of the first client device in the content downloading method in accordance with another embodiment of the present invention.

FIG. 17 is a flowchart schematically illustrating an operation of the first client device CD1 in the content downloading method in accordance with another embodiment of the present invention.

Referring to FIG. 17, first, the first client device CD1 sends a content downloading request that requests the second client device CD2 to download content using NFC to the second client device CD2 using NFC (S1710).

Thereafter, the first client device CD1 is in a wait state until a response indicating that the second client device CD2 has well received the content downloading request is received (S1712).

The first client device CD1 may receive a confirmation message, indicating that the content downloading request has been well received, from the second client device CD2 (i.e., a target device) (S1714).

Furthermore, when a message indicating that the second client device CD2 has started downloading is received (S1716), the first client device CD1 may stay in wait mode for a specific time (S1718) and enters sleep mode (S1720). In this case, the first client device CD1 may enter sleep mode in response to a timer event. If a message indicating that downloading is impossible is received, content downloading may be terminated.

The first client device CD1 in sleep mode may receive a wake-up request from the second client device CD2 when downloading is completed (S1722). When receiving the wake-up request, the first client device CD1 wakes up and switches from sleep mode to active mode (S1724). Thereafter, the first client device CD1 sends a response message for the wake-up request to the second client device CD2 (S1726).

Thereafter, the first client device CD1 determines whether reception conditions of the asset of the downloaded content are satisfied (S1728). If the reception conditions are satisfied, the first client device CD1 may receive the downloaded content from the second client device CD2 (S1730). In this case, in relation to the reception conditions of the asset, a user may control the setting of at least one of a power connection status, a battery status, a network status, and the status of an available storage space through a user interface. The first client device CD1 may determine whether or not to receive the asset by taking into consideration the reception conditions and its current status.

Figure 18:
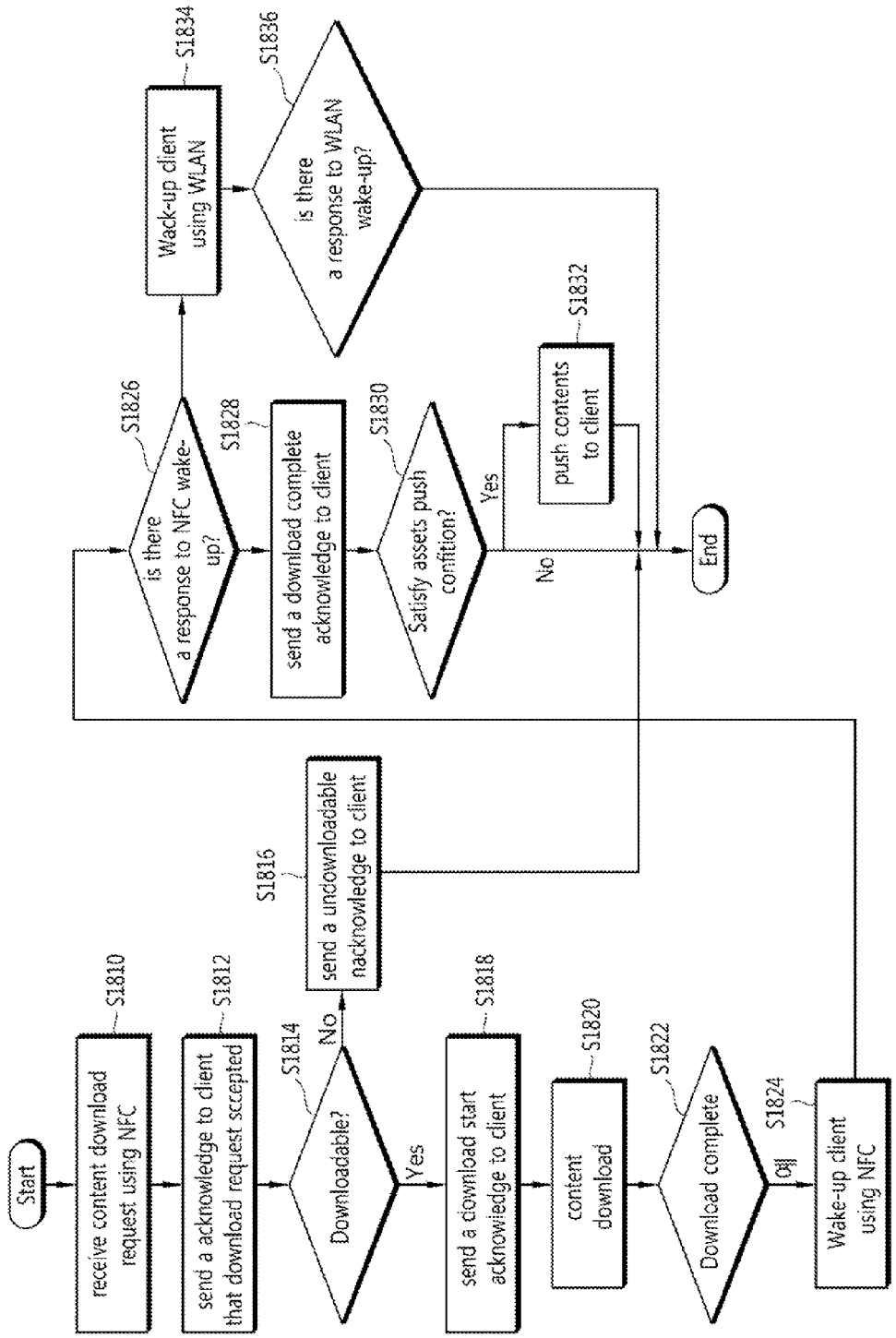
FIG. 18 is a flowchart schematically illustrating an operation of the second client device in the content downloading method in accordance with another embodiment of the present invention.

FIG. 18 is a flowchart schematically illustrating an operation of the second client device CD2 in the content downloading method in accordance with another embodiment of the present invention.

Referring to FIG. 18, the second client device CD2 may receive a content downloading request from the first client device CD1 using NFC (S1810). Thereafter, the second client device CD2 sends a response, indicating that the content downloading request has been received, to the first client device CD1 (S1812).

Furthermore, the second client device CD2 determines whether downloading is possible (S1814). If the content downloading request includes a downloading condition for the second client device CD2 (e.g., the downloading condition may include at least any one of the power connection status, battery status, network status, and state of the available storage space of the second client device CD2), the second client device CD2 may determine whether the downloading is possible based on the downloading condition. Alternatively, the second client device CD2 may autonomously determine whether the downloading is impossible, such as by determining whether a battery is not present, whether power is turned off, whether there is no storage space, or whether another task needs to be performed in a downloading/wake-up time, although a special downloading condition is not present.

If the downloading is determined to be impossible, the second client device CD2 sends a response, indicating that the downloading is impossible, to the first client device CD1 (S1816) and terminates the downloading process. If the downloading is determined to be possible, the second client device CD2 sends a confirmation message, indicating that it will start the downloading, to the first client device CD1 (S1918).

Thereafter, the second client device CD2 downloads content (1820). When the downloading is completed (S1822), the second client device CD2 sends a wake-up request to the first client device CD1 using NFC (S1824). In this case, the second client device CD2 determines whether a response to the NFC wake-up request is present (S1826). If the response is not received for a specific period, the second client device CD2 determines that NFC communication is impossible and sends the wake-up request to the first client device CD1 using a WLAN (or 3G/4G) wireless network (S1834). Thereafter, the second client device CD2 determines whether a response to the WLAN wake-up request is present (S1836). If the response is determined to be present, the second client device CD2 may send a response, indicating that the downloading has been completed, to the first client device CD1 (S1828). At step S1826 of determining whether a response to the NFC wake-up request is present, if a response to the NFC wake-up request is present, the second client device CD2 may directly send the downloading-complete message to the first client device CD1 (S1828).

After sending the downloading-complete message, the second client device CD2 determines whether a condition in which the asset of the downloaded content is transmitted is satisfied (S1830). That is, the second client device CD2 determines whether the first client device CD1 is able to receive the downloaded content by taking into consideration reception conditions of the downloaded content included in the content downloading request. Alternatively, the second client device CD2 determines whether a condition in which the asset of the downloaded content is transmitted is satisfied by directly checking its own status. For example, the second client device CD2 may determine whether or not to send the asset by performing a comparison on the current battery status, power connection status, and network status of the second client device CD2 with consideration taken of the size or capacity of the downloaded content.

If the reception conditions of the first client device CD1 or the transmission conditions of the second client device CD2 are satisfied, the second client device CD2 sends the contend to the first client device CD1 (S1832). If not, the second client device CD2 terminates the downloading process without sending the content.

Figure 19:
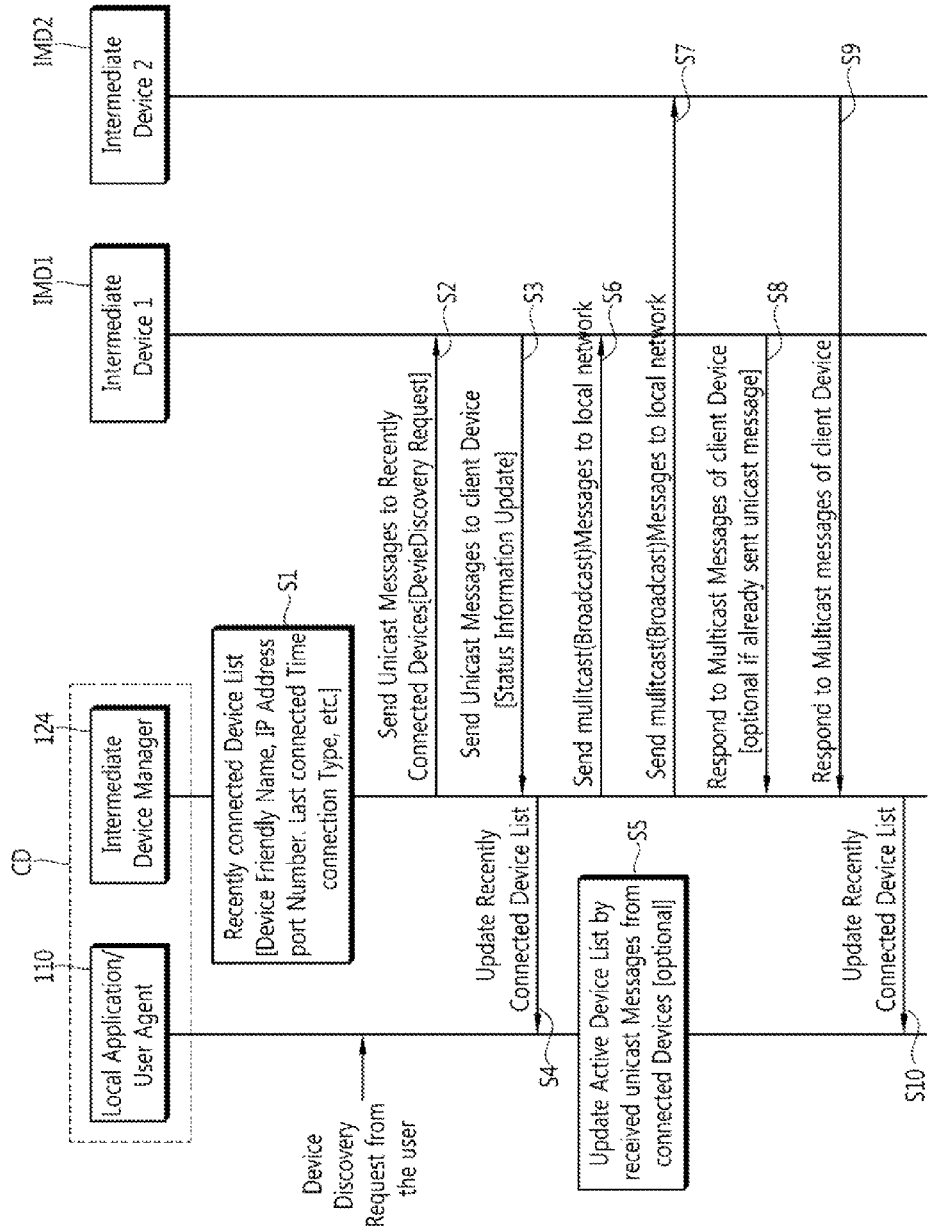
FIG. 19 is a flowchart illustrating a device discovery method of the content downloading method using NFC in accordance with a preferred embodiment of the present invention.

FIG. 19 is a flowchart illustrating a device discovery method of the content downloading method using NFC in accordance with a preferred embodiment of the present invention. FIG. 19 illustrates that the client device CD of the content service system discovers intermediate devices IMD connected to a network. In this case, the client device CD may be the first client device CD1, and the intermediate device IMD may be the second client device CD2.

As illustrated in FIG. 19, the intermediate device manager 124 of the client device CD manages a recently connected device list (step: S1). The recently connected device list may mean a list of devices (e.g., intermediate devices or other client devices) that have recently been connected to the client device CD over a local network.

The recently connected device list may have been stored in the storage of the client device CD, for example, in the virtual storage device 150. For example, when first accessing the network, the client device CD may generate a recently connected list using information obtained through device discovery, may store the recently connected list in the storage, and then may continue to update the recently connected list based on information about devices that is obtained whenever it performs device discovery.

FIG. 20 is a diagram illustrating the structure of the recently connected device list.

As illustrated in FIG. 20, the recently connected device list may include items, such as the device-friendly name, IP address, port number, last connected time, and last connected network access type of each device.

The device-friendly name, the IP address, and the port number may be pieces of information of a string type indicative of the respective friendly name, IP address, and port of each device. The last connected time may be indicative of, for example, time when a signal was last transmitted or received to and from a device. The last connected network access type may mean a connection type indicating that a device has been connected to a network using what method. For example, the last connected network access type may be information of a string type indicative of at least any one of Ethernet, 802.11, MoCA, Bluetooth, and ZigBee.

Meanwhile, the recently connected device list may include a device description. The device description may be access information, for example, a URI or URL on which information device, such as a device capability, may be accessed. When performing device discovery, the client device CD may obtain information about the capability of a device using the URI or URL of the device description.

The device discovery performed by the client device CD may be automatically started when the client device CD accesses a local network or may be started in response to a device discovery request that is transmitted from a user to the local application 110.

First, the client device CD may unicast a unicast device discovery request message to devices, having a history of recently being connected to the client device CD within the network, based on the recently connected device list. For example, in the description of the present embodiment, it is assumed that information about a first intermediate device IMD1 is included in the recently connected device list. The client device CD may unicast the unicast device discovery request message to the first intermediate device IMD1 based on the recently connected device list (step: S2).

Each of the devices that have received the unicast device discovery request message may send a unicast device discovery response message, that is, a response to the unicast device discovery request message, to the client device CD. For example, the first intermediate device IMD1 that has received the unicast device discovery request message may send the unicast device discovery response message to the client device CD as a response (step: S3).

The client device CD that has received the unicast device discovery response message may update the recently connected device list based on the received unicast device discovery response message (step: S4). For example, the intermediate device manager 124 of the client device CD may update the last connected time, last connected network access type, etc. of the first intermediate device IMD1 with new information in the recently connected device list based on information included in the unicast device discovery response message.

Figure 21:
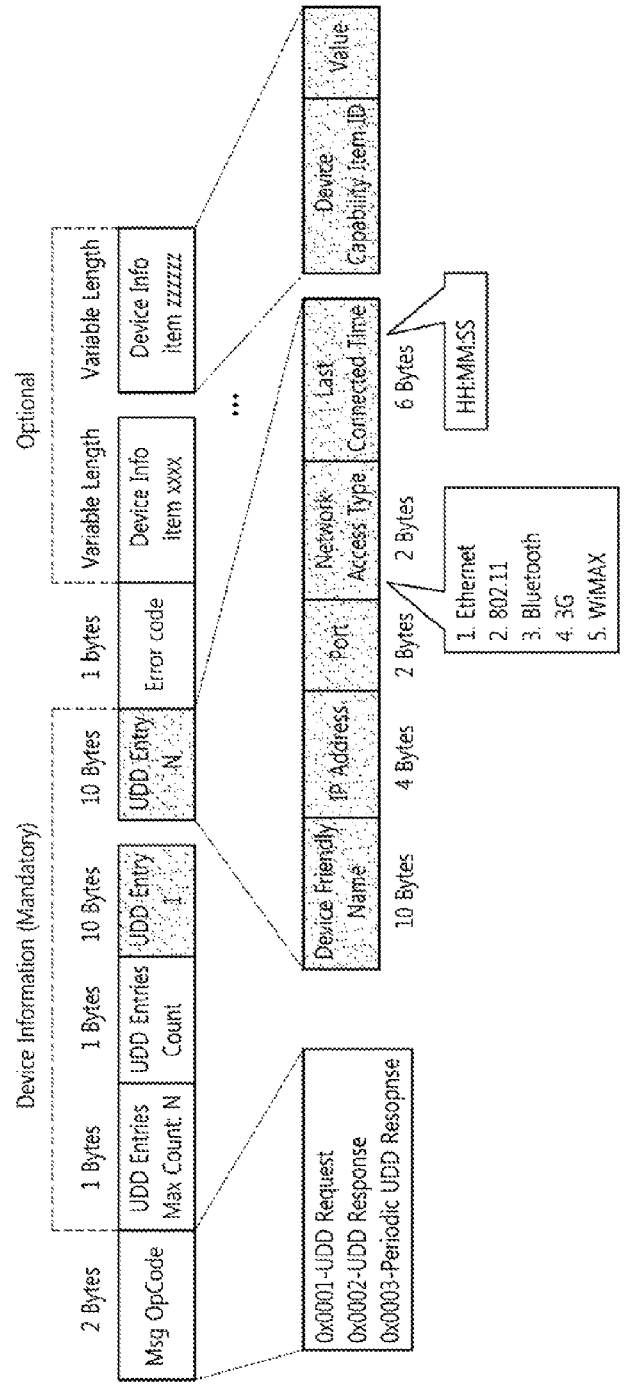
FIG. 21 is an exemplary diagram illustrating the structure of a unicast device discovery message used in a unicast device discovery request or response.

FIG. 21 is an exemplary diagram illustrating the structure of a unicast device discovery message used in a unicast device discovery request or response.

As illustrated in FIG. 21, the unicast device discovery message includes a message code field. The message code may be information indicating whether the message is a request message or a response message.

The unicast device discovery message further includes at least one unicast device discovery entry field. The unicast device discovery entry field may include a device-friendly name field into which a device-friendly name is inserted, an IP address field into which an IP address is inserted, a port number field into which a port number is inserted, a last connected time field into which the last connected time is inserted, and a network access type field into which a network access type is inserted.

The unicast device discovery message may further include a device information item field. The device information item field may be used for the client device CD to obtain a variety of pieces of information about a discovered device, for example, the first intermediate device IMD1. For example, the client device CD may insert information to be obtained, for example, information about a device capability item into the device information item field of a unicast device discovery request message and send the unicast device discovery request message to the first intermediate device IMD1.

In response thereto, the first intermediate device IMD1 may insert the requested information of the first intermediate device IMD1 into the device information item field of a device discovery response message and send the device discovery response message to the client device CD. In response thereto, the client device CD may update information about the first intermediate device IMD1 based on the received information of the first intermediate device IMD1.

Meanwhile, the client device CD that has updated the recently connected device list in response to the unicast device discovery response message may update an active device list (step: S5). The active device list may be information indicative of network devices now in an active state. For example, the first intermediate device IMD1 that has sent the unicast device discovery response message is now in an active state, and thus the client device CD may update the active device list because the status of the first intermediate device IMD1 is active.

The local application 110 of the client device CD may display the updated active device list or the updated recently connected device list on a screen of the client device CD. Accordingly, a user may rapidly check devices that are now available on the network through the active device list or recently connected device list displayed on the screen of the client device CD.

Meanwhile, the client device CD may multicast (or broadcast) a multicast device discovery request message to devices connected to the network. For example, the client device CD may send the multicast device discovery request message to the first intermediate device IMD1 and the second intermediate device IMD2 (step: S6, S7).

Assuming that the second intermediate device IMD2 is not included in the recently connected device list, the second intermediate device IMD2 has not yet been discovered by the client device CD. Accordingly, the second intermediate device IMD2 may send a multicast device discovery response message to the client device CD in response to the multicast device discovery message received from the client device CD (step: S9). The first intermediate device IMD1 may send a multicast device discovery response message to the client device CD, but may not send the multicast device discovery response message if it has already sent a unicast message to the client device CD (step: S8).

The client device CD may update the recently connected device list based on the received multicast device discovery response message (step: S10). For example, the intermediate device manager 124 of the client device CD may newly add information about the second intermediate device IMD2 to the recently connected device list.

Furthermore, the client device CD may update the active device list based on the received multicast device discovery response message. The local application 110 may display the newly updated active device list or the updated recently connected device list on a screen of the client device CD.

As described above, in accordance with the device discovery according to a preferred embodiment of the present invention, a client device CD manages devices that have recently been connected thereto using a recently connected device list. When performing device discovery, the client device CD may rapidly discover devices in the recently connected device list based on unicast by checking the recently connected device list. Accordingly, a user may first rapidly check available network devices even before device discovery based on multicast is executed and completed.

The device discovery may also be applied to various network systems based on Universal Plug and Play (UPnP) and Digital Living Network Alliance (DLNA) in addition to the illustrated content service system.

For example, in general, a DLNA device, for example, a Digital Media Controller (DMC) discovers almost the same device whenever it performs device discovery in the same network domain, for example, in a home network or an office domain. The reason for this is that devices belonging to the home network or the office domain, for example, a Digital Media Server (DMS) and a Digital Media Renderer (DMR) are almost fixed. Accordingly, in such a system, device discovery according to the present invention can be very efficient.

A DMC may store device information that includes a device profile and a description file connected to a network domain. The device information may be a recently connected device list, for example. Although the DMC leaves the network domain, the DMC may manage the device information.

For efficient and rapid discovery, when entering the network, the DMC may send a unicast message, including a device profile, to each of devices using an IP address registered with the device information based on the device information. That is, the DMC performs device discovery based on sending a unicast message to the IP address of each of recently connected devices. Accordingly, the DMC may first display the recently connected devices through a user interface.

Figure 22:
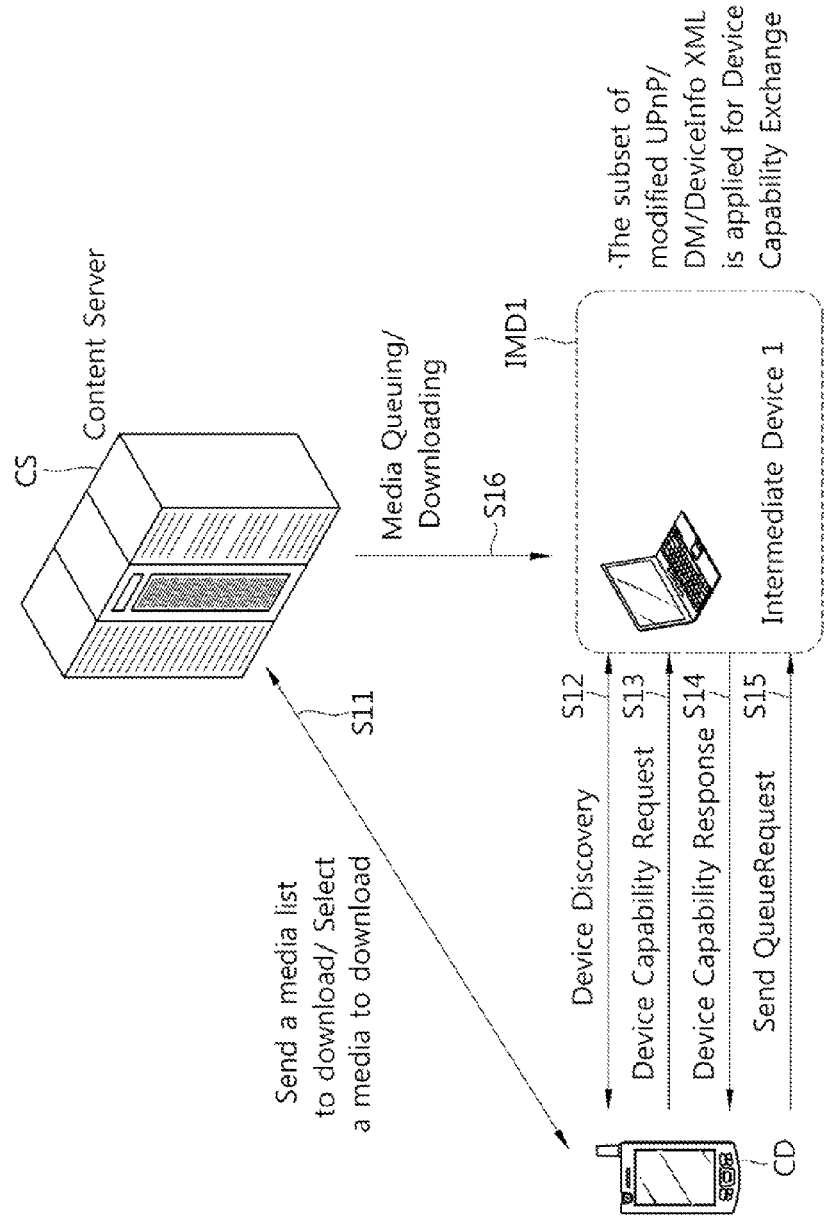
FIG. 22 illustrates a content downloading procedure based on device discovery and the exchange of device capabilities.

FIG. 22 illustrates a content downloading procedure based on device discovery and the exchange of device capabilities.

As illustrated in FIG. 22, a client device CD may be provided with a content (e.g., media hereinafter) list from a content server CS and may select desired media to be downloaded (step: S11). A user tries to download the selected media using an intermediate device connected to a network under the control of the client device CD.

The client device CD may perform a device discovery procedure along with a first intermediate device IMD1 (step: S12). The device discovery procedure may be performed in accordance with the procedure described with reference to FIG. 4. For example, as in the aforementioned device discovery procedure, the intermediate device manager 124 of the client device CD may send a unicast device discovery request message to the first intermediate device IMD1 based on a recently connected device list and may receive a unicast device discovery response message, that is, a response to the unicast device discovery request message, from the first intermediate device IMD1.

When device discovery is completed, the intermediate device manager of the client device CD may send a device capability request message that requests the device capability of the first intermediate device IMD1 to the first intermediate device IMD1 (step: S13). The first intermediate device IMD1 that has received the device capability request message may send a device capability response message, including the requested device capability, to the client device CD (step: S14). The device capability may be information of an Extensible Markup Language (XML) type and may include a plurality of capability items.

Meanwhile, the client device CD may obtain the device capability of the first intermediate device IMD1 when performing device discovery without the device capability request/response using the structure of the unicast device discovery message illustrated in FIG. 21. For example, the client device CD may insert information about device capability items to be obtained into the device information item field of a unicast device discovery request message and send the unicast device discovery request message to the first intermediate device IMD1. In such a case, the first intermediate device IMD1 may insert the requested device capability items into the device information item field of a unicast device discovery response message and send the unicast device discovery response message to the client device CD. Accordingly, the device capability of the first intermediate device IMD1 may be delivered to the client device CD through the device discovery procedure. In such a case, separate device capability request and response procedures may be omitted.

The client device CD that has obtained the device capability of the first intermediate device IMD1 sends a queue request that requests the selected media to be downloaded from a specific entity based on the device capability to the first intermediate device IMD1 (step: S15). For example, the queue manager of the first intermediate device IMD1 may send the queue request to the first intermediate device IMD1 via the Q3 interface.

The queue request may include access information on which the first intermediate device IMD1 is able to download an asset, for example, a media file suitable for the capability of the first intermediate device IMD1. The queue request may include an identifier for identifying the selected media and access information on which the asset to be substantially downloaded in response to the media, for example, a media file may be identified and accessed. For example, assuming that the identifier of the media is information that identifies a movie 'Avatar', the access information may be information for identifying and accessing a physical 'Avatar file' to be actually downloaded. For example, the access information may include a URL, URI, or information of a file name type.

That is, the client device CD transfers information on which a media file suitable for the capability of the first intermediate device IMD1 is able to be downloaded to the first intermediate device IMD1 through the queue request.

For example, the client device CD may check the storage capacity and storage usage of the first intermediate device IMD1 and the media profile using the device capability of the first intermediate device IMD1 received from the first intermediate device IMD1 and may transfer media, corresponding to the size that may be downloaded by the first intermediate device IMD1 and the media profile that may be supported by the first intermediate device IMD1, to the first intermediate device IMD1 through the queue request.

The first intermediate device IMD1 that has received such a queue request may access the content server based on the information included in the queue request and download a media file that corresponds to the selected media and that is suitable for the first intermediate device IMD1 from the content server (step: S16).

Meanwhile, the client device CD may determine whether or not to send the queue request to the first intermediate device IMD1 depending on whether a specific device capability of the first intermediate device IMD1 satisfies a policy managed by the client device CD based on the policy. For example, the policy client 140 of the client device CD may store and manage policies received from the content policy server 300. The policy client 140 may determine whether a specific device capability received from the first intermediate device IMD1 satisfies a specific policy. If the specific device capability satisfies the specific policy, the policy client 140 may control the queue manager 122 so that it sends a queue request to the first intermediate device IMD1. If the specific device capability does not satisfy the specific policy, the policy client 140 may block the queue request and output an error message through the local application 110.

For example, the client device CD may check the storage capacity and storage usage of the first intermediate device IMD1 using the device capability received from the first intermediate device IMD1 and check whether the size of a media file to be downloaded that is permitted in a policy is equal to or smaller than the remaining storage size of the first intermediate device IMD1. If the size of the media file to be downloaded is greater than the remaining storage size of the first intermediate device IMD1, the client device CD may output an error message and may not send the queue request.

For example, assuming that a network access type permitted in a policy is only Wi-Fi (802.11), the client device CD may check the network access type of the first intermediate device IMD1 using the device capability received from the first intermediate device IMD1. If the Wi-Fi (802.11) is not included in the network access type of the first intermediate device IMD1, the client device CD may output an error message and block the queue request.

For example, if a policy permits downloading only when the power level of the first intermediate device IMD1 is 50% or more, the client device CD may not send the queue request to the first intermediate device IMD1 when a power level included in the device capability of the first intermediate device IMD1 is less than 50%. For example, if a policy permits downloading only when the supporting media profile of the first intermediate device IMD1 is 'HD', the client device CD may not send the queue request to the first intermediate device IMD1 when the supporting media profile of the first intermediate device IMD1 is 'PD' or 'SD'.

Meanwhile, for example, assuming that a maximum number of queue requests included in the device capability of the first intermediate device IMD1 is 3, if a current number of queue requests included in the device capability of the first intermediate device IMD1 is 2 or less, the client device CD may send the queue request to the first intermediate device IMD1. If a current number of queue requests is 3 equal to the maximum number of queue requests, the client device CD may not send the queue request to the first intermediate device IMD1.

Figure 23:
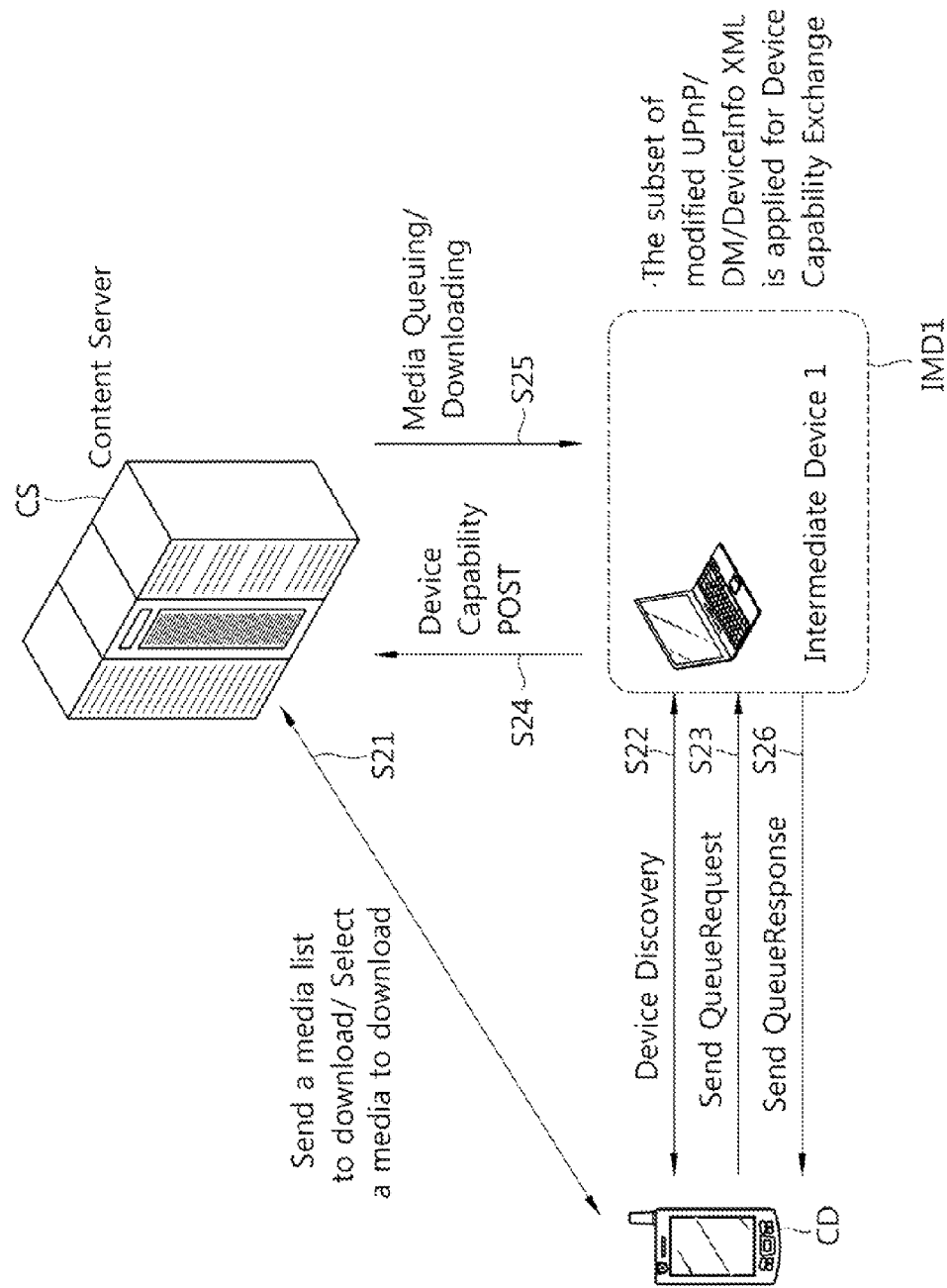
FIG. 23 illustrates a content downloading procedure based on the exchange of device capabilities between a content server and an intermediate device.

FIG. 23 illustrates a content downloading procedure based on the exchange of device capabilities between a content server CS and an intermediate device.

As illustrated in FIG. 23, a client device CD may receive a content (e.g., media hereinafter) list from a content server and select desired media to be downloaded (step: S21). The client device CD tries to download the selected media using an intermediate device connected to a network.

The client device CD may perform a device discovery procedure along with a first intermediate device IMD1 (step: S22). The device discovery procedure may be performed in accordance with the procedure described with reference to FIG. 4. For example, as in the aforementioned device discovery procedure, the intermediate device manager of the client device CD may send a unicast device discovery request message to the first intermediate device IMD1 based on a recently connected device list and receive a unicast device discovery response message, that is, a response to the unicast device discovery request message, from the first intermediate device IMD1.

When device discovery is completed, the client device CD sends a queue request that requests the selected media to be downloaded from a specific entity to the first intermediate device IMD1 (step: S23). For example, the queue manager of the first intermediate device IMD1 may send the queue request to the first intermediate device IMD1 via the Q3 interface. The queue request may include the identifier of the media and access information that is required for the first intermediate device IMD1 to download an asset corresponding to the media.

The first intermediate device IMD1 that has received such a queue request accesses the content server based on the information included in the queue request and sends the device capability of the first intermediate device IMD1 to the content server (step: S24). The content server may download a media file suitable for the first intermediate device IMD1 to the first intermediate device IMD1 based on the device capability (step: S25).

Meanwhile, the content server CS may determine whether or not to send a queue request for downloading depending on whether a specific device capability of the first intermediate device IMD1 satisfies a policy managed by a content policy server PS based on the policy. For example, the content server CS may check the storage capacity and storage usage of the first intermediate device IMD1 using the device capability received from the first intermediate device IMD1 and check whether the size of a media file to be downloaded that is permitted in the policy is equal to or smaller than the remaining storage size of the first device IMD1. If the size of the media file to be downloaded is greater than the remaining storage size of the first intermediate device IMD1, the content server CS may not send the queue request. In such a case, the content server CS may send an error message to the client device CD or the first intermediate device IMD1. Likewise, the content server CS may determine whether or not to send the queue request by checking the device capability, received from the first intermediate device IMD1, based on various items included in the policy, such as a network access type, a power level, and a supporting media profile.

FIG. 24 is a table illustrating a device capability structure. The device capability given in the above description, for example, in the descriptions of FIGS. 22 and 23 may have a device capability structure illustrated in FIG. 24.

As illustrated in FIG. 24, the device capability may include capability items, such as a device ID, a device name, a device friendly name, a user ID, a current power source, a charging status, a power level, supporting media profiles, supporting codec types, a storage capacity, storage function groups, a point node, storage usage, a maximum size of a queue request, a maximum number of queue requests, a current number of queue requests, the network interface number of entries, a network access type, media transport, and a bandwidth limit.

The device ID may mean an identifier that identifies a device globally and uniquely. The value of the device ID may be information of a string type. The device name may mean a universally unique identifier for a device. The value of the device name may be information of a string type, for example. The device friendly name is a short description for an end user, and a value thereof may be information of a string type. The user ID is an identifier for identifying an end user, and a value thereof may be information of a string type.

The current power source is a description indicative of a current power source of a device, and a value thereof may be a string. For example, the value of the current power source may be set as 'AC Power' meaning that a device has been supplied with AC power and as 'battery' meaning that a device has been supplied with power from a battery. If a device is supplied with AC power from an AC source, the value of the current power source may be set to 'AC Power'. If a device is supplied with power from a battery, the value of the current power source may be set to 'battery'.

The charging status is a capability item indicative of a current charging status of a battery, and a value thereof may be information of a string type. The value of the charging status may be set as 'Available' meaning that a battery has been installed in a device and the installed battery is working, as 'Charging' meaning that a battery has been installed in a device and the battery is being charged, as 'Unavailable' meaning that a battery has not been installed in a device, and 'Error' meaning that a battery has been installed in a device, but does not correctly perform its function.

The power level may be indicative of a current power level of a battery. For example, the value of the power level may be a percentage value. For example, '0' may mean that a battery has been fully discharged or that a battery has not been installed. '100' may mean that a battery has been fully charged.

The supporting media profiles may be indicative of supportable media profile types. The value of the supporting media profiles is information of a string type and may be set as, for example, 'High Definition (HD)' indicative of high picture quality, 'Standard Definition (SD)' indicative of normal picture quality, and 'Portable Definition (PD)' indicative of portable picture quality.

The supporting codec types are a list of supported codec types, and a value thereof may be information of a string type. The storage capacity may be indicative of an available amount of storage.

The storage function group is indicative of a function group related to the storage of a device, for example, a virtual storage device, and a value thereof may be information of a string type. The value of the function group may be 'access control', 'capacity management', 'expiration', 'transformation', 'play list', etc.

The 'access control' is indicative of an access control function group that relays between different applications using a virtual storage device. For example, the access control function group may prevent a specific application from accessing content associated with another application.

The 'capacity management' may be indicative of a capacity management function group that enables a virtual storage device to manage its storage space based on priority. For example, an asset having high priority is downloaded, the capacity management group may discard an asset having lower priority in order to make room for the asset having higher priority.

The 'expiration' may be indicative of an expiration function group that enables a virtual storage device to store content based on a specific date range. The 'transformation' may be indicative of a transformation function group that permits a transformative operation while content is read from a virtual storage device or written into the virtual storage device.

The 'play list' may be indicative of a play list function group that enables a virtual storage device to process a play list. If a play list function group is present, a play list may be used by group entities.

Meanwhile, the storage usage may be indicative of a total amount of storage that is now available. The value of the storage usage may be a percentage value. For example, if the value of the storage usage is '0', it may mean that storage is completely unoccupied. If the value of the storage usage is '100', it may mean that storage is fully occupied.

The maximum size of a queue request, the maximum number of queue requests, the current number of queue requests, and the network interface number of entries may be indicative of a maximum size of a queue request, a total number of queue requests that may be presented for a given time, a current number of queue requests other than a complete status, and the number of network interfaces, respectively.

The network access type may be indicative of an available network access interface type. The value of the network access type may be information of a string type. The value of the network access type may be 'Ethernet', '801.11', 'Bluetooth', '3G', or 'WiMAX', for example.

The media transport may be indicative of a transport protocol type supported for the D3, D4, and D1 interfaces. The value of the media transport may be 'HTTP' or 'RTP', for example. The bandwidth limit may be indicative of an available bandwidth of a network interface.

Although the preferred embodiments of the present invention have been illustrated above, those skilled in the art will appreciate that the present invention may be modified in various ways without departing from the technological details and scope of the present invention defined in the appended claims. Accordingly, a future change of the embodiments of the present invention will not depart from the technology of the present invention.

CD: client device
CD1: first client device
CD2: second client device
CD3: third client device
110: local application/user agent
112: local application
114: user agent
120: queue/policy engine
122: queue manager
124: intermediate device manager
126: policy client
130: player
140: network policy client
150: virtual storage device
160: communication unit
260: communication unit
300: another device
400: cloud service server
CS: content server
CPS: content policy server
NPS: network policy server
IMD: intermediate device

What is claimed is:

1. A content downloading method performed by a first device, the content downloading method comprising:
sending a content downloading request that requests content to be downloaded using a second device;
receiving confirmation that responds to the content downloading request from a device that has received the content downloading request;
receiving a wake-up request from the second device; and
receiving the content, downloaded to the second device, from the second device in response to the content downloading request,
wherein the first device receives the downloaded content by determining whether the downloaded content is able to be received based on predetermined reception condition information,
wherein the first device communicates with the second device using Near Field Communication (NFC), and
wherein the first device operates as a sleep mode in response to the received confirmation, while the second device is performing content downloading from a content server.

2. The content downloading method of claim 1, wherein the reception condition information of the downloaded content comprises at least any one of a power connection status condition, battery status condition, network status condition, and available storage space condition.

3. The content downloading method of claim 2, wherein the receiving the downloaded content comprises a step of determining whether the reception condition is satisfied by directly comparing the status of the first device with the reception condition information and receiving the downloaded content based on a result of the determination.

4. The content downloading method of claim 2, wherein the receiving the downloaded content comprises a step of:
determining, by the second device, whether the reception condition is satisfied by comparing the status of the first device with the reception condition information and receiving the downloaded content based on a result of the determination.

5. The content downloading method of claim 1, wherein at least any one of the content downloading request, the confirmation, and the wake-up request is transmitted and received using NFC.

6. The content downloading method of claim 1, wherein the receiving the wake-up request comprises at least one of:
receiving the wake-up request through NEC; and
receiving the wake-up request through a Wireless Local Area Network (WLAN) or 3G/4G wireless communication.

7. The content downloading method of claim 1, wherein the content downloading request comprises downloading-related information, comprising source URI information of the downloading content, a downloading time indicative of an available downloading time, and wake-up time information indicative of a downloading start time.

8. The content downloading method of claim 1, wherein the sending the content downloading request comprises at least any one of:
directly sending the content downloading request to the second device; and
sending the content downloading request to a third device.

9. The content downloading method of claim 8, wherein the third device is a device for relaying between a server related to a cloud service or the first device and the second device.

10. The content downloading method of claim 1, further comprising:
displaying a user interface for selecting the content to be downloaded; and
selecting the content in response to a content selection signal,
wherein the step of sending the content downloading request comprises a step of automatically sending the content downloading request based on the selection of the content to the second device, when the first device is placed within a specific radius of the second device, and
wherein the content download request comprises network information for automating NFC link set-up and protocol.

11. The content downloading method of claim 1, further comprising:
discovering accessible surrounding devices using a recently connected device list; and
obtaining a source URI of content to be downloaded from a content server.

12. A content downloading apparatus, comprising:
a transmission unit which sends a content downloading request that requests content to be downloaded using a second device; and
a reception unit which receives confirmation responding to the content downloading request, receives a wake-up request from the second device, and receives the content, downloaded to the second device, from the second device in response to the content downloading request,
wherein the reception unit receives the downloaded content by determining whether the downloaded content is able to be received based on predetermined reception condition information,
wherein the transmission unit and the reception unit communicate with the second device using Near Field Communication (NFC), and
wherein the content downloading apparatus operates as a sleep mode in response to the confirmation receiving, while the second device is performing content downloading from a content server.

13. A content downloading method performed by a second device, the content downloading method comprising:
receiving a content downloading request from at least any one of a first device and a third device;
sending confirmation responding to the content downloading request;
downloading content to be downloaded based on the content downloading request;
sending a wake-up request to the first device; and
sending the downloaded content to the first device,
wherein the first device communicates with the second device using Near Field Communication (NFC), and
wherein the first device operates as a sleep mode in response to the confirmation receiving, while the second device is performing content downloading from a content server.

14. The content downloading method of claim 13, wherein the reception condition information of the downloaded content comprises at least any one of a power connection status condition, battery status condition, network status condition, and available storage space condition.

15. The content downloading method of claim 13, Wherein whether or not to receive the downloaded content is determined by taking a size or capacity of the downloaded content.

16. The content downloading method of claim 13, wherein the reception condition information of the downloaded content comprises at least any one of a power connection status condition, a battery status condition, network status condition, and available storage space condition.

17. The content downloading method of claim 13, wherein the sending the wake-up request transmission comprises:
  sending the wake-up request through NFC; and
  sending the wake-up request through a Wireless Local Area Network (WLAN) or 3G/4G wireless communication if a response to the wake-up request transmitted through NFC is not received from the first device for a reference time.

18. A content downloading apparatus, comprising:
  a reception unit which receives a content downloading request from at least any one of a first device and a third device and downloads content from the first server based on the content downloading request; and
  a transmission unit which sends confirmation responding to the content downloading request, sends a wake-up request to the first device, and sends the downloaded content to the first device,
  wherein the downloaded content is transmitted by determining whether the downloaded content is able to be received based on reception condition information set by the first device,
  wherein the reception unit and the transmission unit communicate with the first device using Near Field Communication (NFC), and
  wherein the first device operates as a sleep mode in response to the confirmation receiving, while the content downloading apparatus is performing content downloading from a content server.

19. A content downloading system, comprising:
  a first device which sends a content downloading request that requests content to be downloaded using a second device, receives confirmation responding to the content downloading request, receives a wake-up request from the second device, and receives the content, downloaded to the second device, in response to the content downloading request; and
  a second device which receives the content downloading request, sends the confirmation, downloads the content to be downloaded based on the content downloading request, sends the wake-up request to the first device, and sends the downloaded content to the first device,
  wherein at least one of the first device and the second device receives or sends the downloaded content by determining whether the downloaded content is able to be received based on reception condition information set by the first device,
  wherein the first device communicates with the second device using Near Field Communication (NFC), and
  wherein the first device operates as a sleep mode in response to the confirmation receiving, while the second device is performing content downloading from a content server.

20. The content downloading system of claim 19, further comprising:
  a third device which receives the content downloading request from the first device, sends the confirmation responding to the content downloading request to the first device, and sends the content downloading request to a second device.

* * * * *